United States Patent
Baratz

(10) Patent No.: US 10,123,070 B2
(45) Date of Patent: *Nov. 6, 2018

(54) METHOD AND SYSTEM FOR CENTRAL UTILIZATION OF REMOTELY GENERATED LARGE MEDIA DATA STREAMS DESPITE NETWORK BANDWIDTH LIMITATIONS

(71) Applicant: MOBILATV LTD., Moshav Adanim (IL)

(72) Inventor: Nati Baratz, Moshav Adanim (IL)

(73) Assignee: MOBILATV LTD., Moshav Adanim (IL)

(*) Notice: Subject to any disclaimer, the term of this patent is extended or adjusted under 35 U.S.C. 154(b) by 18 days.

This patent is subject to a terminal disclaimer.

(21) Appl. No.: 15/484,676

(22) Filed: Apr. 11, 2017

(65) Prior Publication Data

US 2017/0251241 A1    Aug. 31, 2017

Related U.S. Application Data

(63) Continuation of application No. 13/874,024, filed on Apr. 30, 2013, now Pat. No. 9,661,047.

(Continued)

(51) Int. Cl.
  *G06F 15/16* (2006.01)
  *H04N 21/4335* (2011.01)
  (Continued)

(52) U.S. Cl.
  CPC ....... *H04N 21/4335* (2013.01); *G11B 27/031* (2013.01); *H04L 65/60* (2013.01);
  (Continued)

(58) Field of Classification Search
  CPC .......... H04N 21/4335; H04N 21/2743; H04N 21/4223; H04N 21/4307; H04L 65/60
  See application file for complete search history.

(56) References Cited

U.S. PATENT DOCUMENTS

2006/0245733 A1  11/2006  Hino et al.
2007/0113184 A1   5/2007  Haot et al.
(Continued)

FOREIGN PATENT DOCUMENTS

EP    0895623 A1    2/1999
EP    1213915 A2    6/2002
(Continued)

*Primary Examiner* — Tonia L Dollinger
*Assistant Examiner* — Steven C Nguyen
(74) *Attorney, Agent, or Firm* — Browdy and Neimark, PLLC

(57) ABSTRACT

A computerized method for integrating media streams from a multiplicity of media systems over at least one network into a single media product at high media technical quality, the method comprising the steps of, at certain media systems from among the multiplicity thereof: a. Generating a low volume (LV) media stream representation from a high volume media stream, where the low volume stream's bit-rate is different from the high volume stream's bit-rate; b. streaming the low volume media stream to a content generation center via a data communication network; c. Maintaining high volume local data as a high volume media stream in a storage medium coupled to at least one of the media systems; and d. maintaining mapping information between the low volume stream and the high volume local data for enabling access to media portions in the high volume media stream storage, which correspond based on LV stream time.

32 Claims, 12 Drawing Sheets

Related U.S. Application Data

(60) Provisional application No. 61/640,281, filed on Apr. 30, 2012.

(51) Int. Cl.

| | | |
|---|---|---|
| *H04L 29/06* | (2006.01) | |
| *H04N 21/2743* | (2011.01) | |
| *H04N 21/414* | (2011.01) | |
| *H04N 21/4223* | (2011.01) | |
| *H04N 21/43* | (2011.01) | |
| *H04N 21/4402* | (2011.01) | |
| *H04N 21/6332* | (2011.01) | |
| *H04N 21/81* | (2011.01) | |
| *H04N 21/845* | (2011.01) | |
| *H04N 21/854* | (2011.01) | |
| *G11B 27/031* | (2006.01) | |
| *H04N 21/2187* | (2011.01) | |
| *H04N 21/2662* | (2011.01) | |
| *H04N 21/433* | (2011.01) | |

(52) U.S. Cl.
CPC ..... *H04N 21/2187* (2013.01); *H04N 21/2662* (2013.01); *H04N 21/2743* (2013.01); *H04N 21/41407* (2013.01); *H04N 21/4223* (2013.01); *H04N 21/4307* (2013.01); *H04N 21/4334* (2013.01); *H04N 21/4402* (2013.01); *H04N 21/44029* (2013.01); *H04N 21/6332* (2013.01); *H04N 21/816* (2013.01); *H04N 21/8456* (2013.01); *H04N 21/854* (2013.01); *H04N 21/85406* (2013.01)

(56) References Cited

U.S. PATENT DOCUMENTS

| | | | |
|---|---|---|---|
| 2008/0219638 A1* | 9/2008 | Haot | H04N 21/25866 386/250 |
| 2009/0085740 A1* | 4/2009 | Klein | G08B 13/19695 340/540 |
| 2009/0147859 A1* | 6/2009 | McGowan | H04N 21/23424 375/240.26 |
| 2009/0307368 A1* | 12/2009 | Sriram | H04N 21/23406 709/231 |
| 2010/0150245 A1 | 6/2010 | Camp, Jr. et al. | |
| 2011/0202967 A1 | 8/2011 | Hecht et al. | |
| 2011/0225315 A1 | 9/2011 | Wexler et al. | |

FOREIGN PATENT DOCUMENTS

| | | |
|---|---|---|
| EP | 1472871 A1 | 11/2004 |
| EP | 1503381 A2 | 2/2005 |
| EP | 1851683 A1 | 11/2007 |
| EP | 2242057 A2 | 10/2010 |
| EP | 2263377 A1 | 12/2010 |
| EP | 2301241 A1 | 3/2011 |
| FR | 2933226 A1 | 1/2010 |
| WO | 9739411 A1 | 10/1997 |
| WO | 0189221 A1 | 11/2001 |
| WO | 03056822 A1 | 7/2003 |
| WO | 2005053300 A2 | 6/2005 |
| WO | 2006083661 A1 | 8/2006 |
| WO | 2008151416 A1 | 12/2008 |
| WO | 2009114723 A1 | 9/2009 |
| WO | 2011043886 A1 | 4/2011 |

* cited by examiner

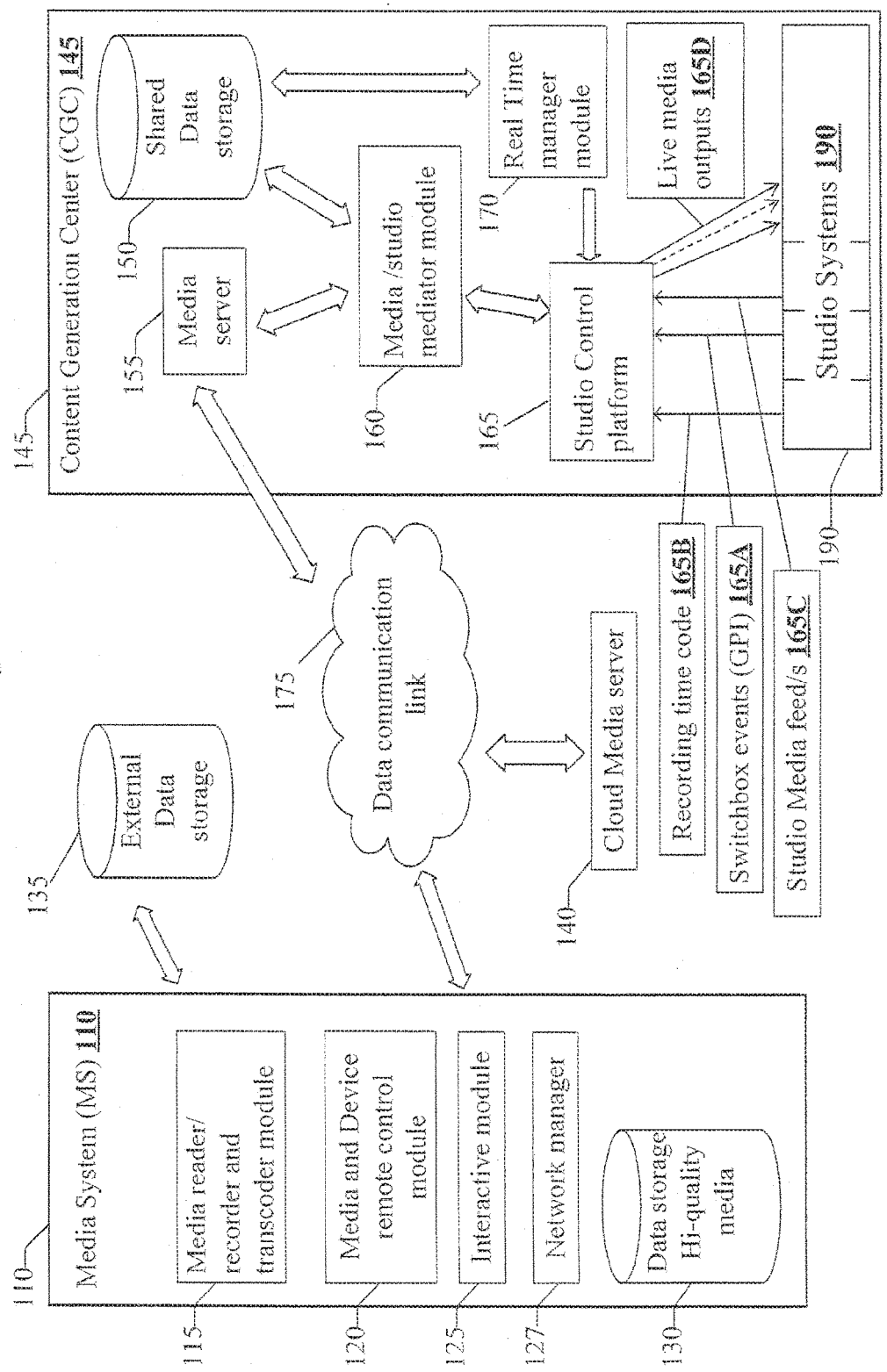

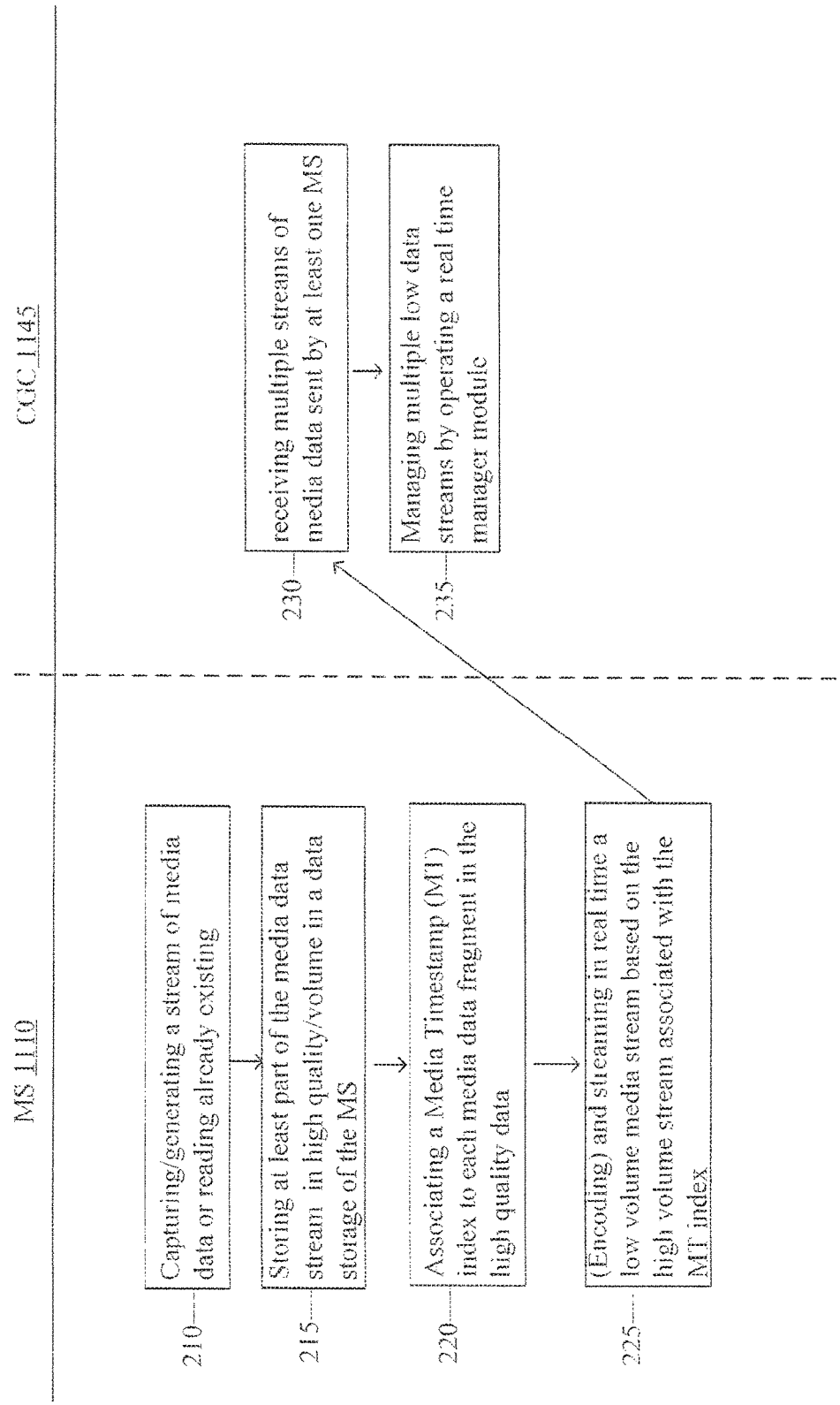

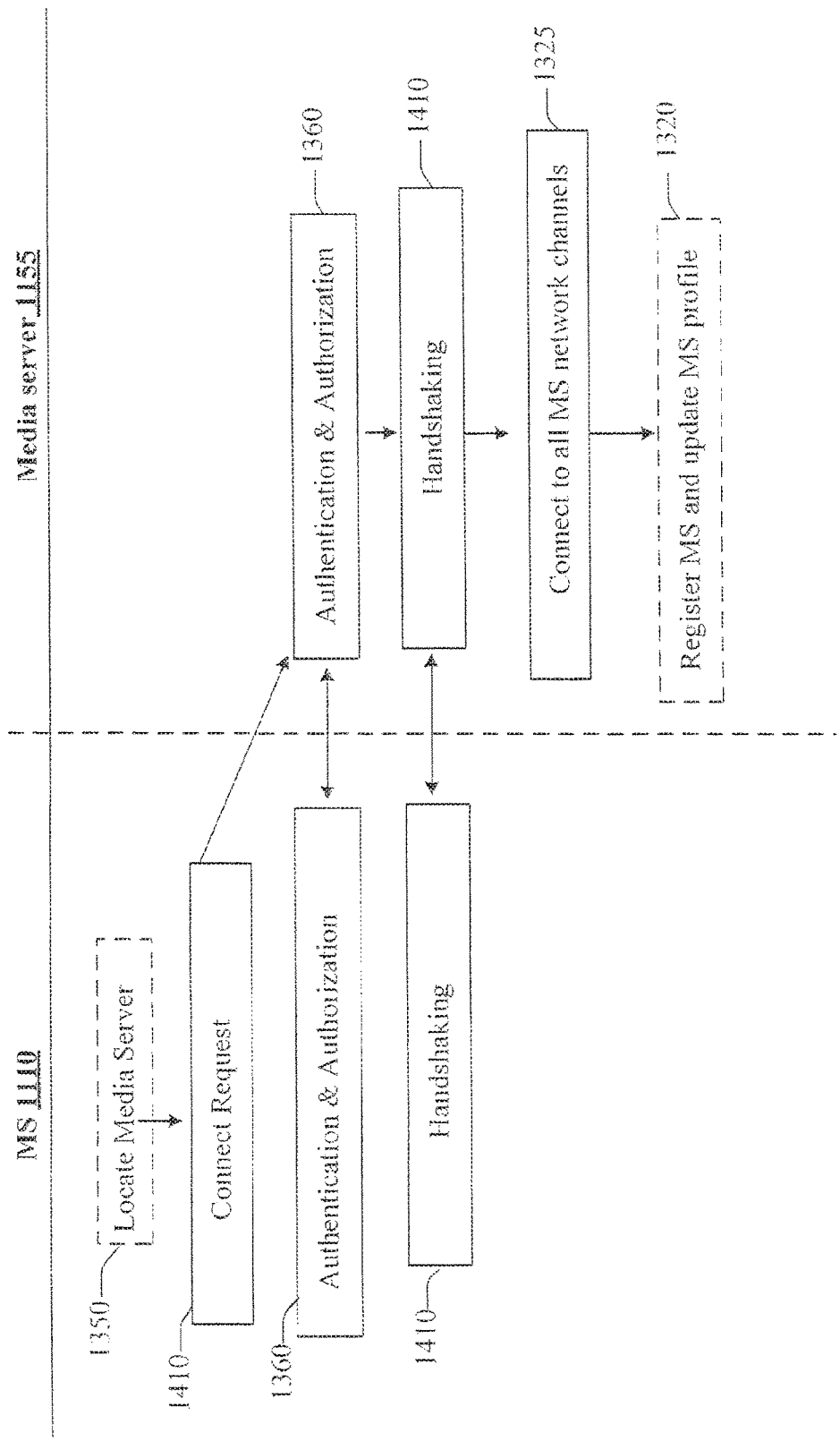

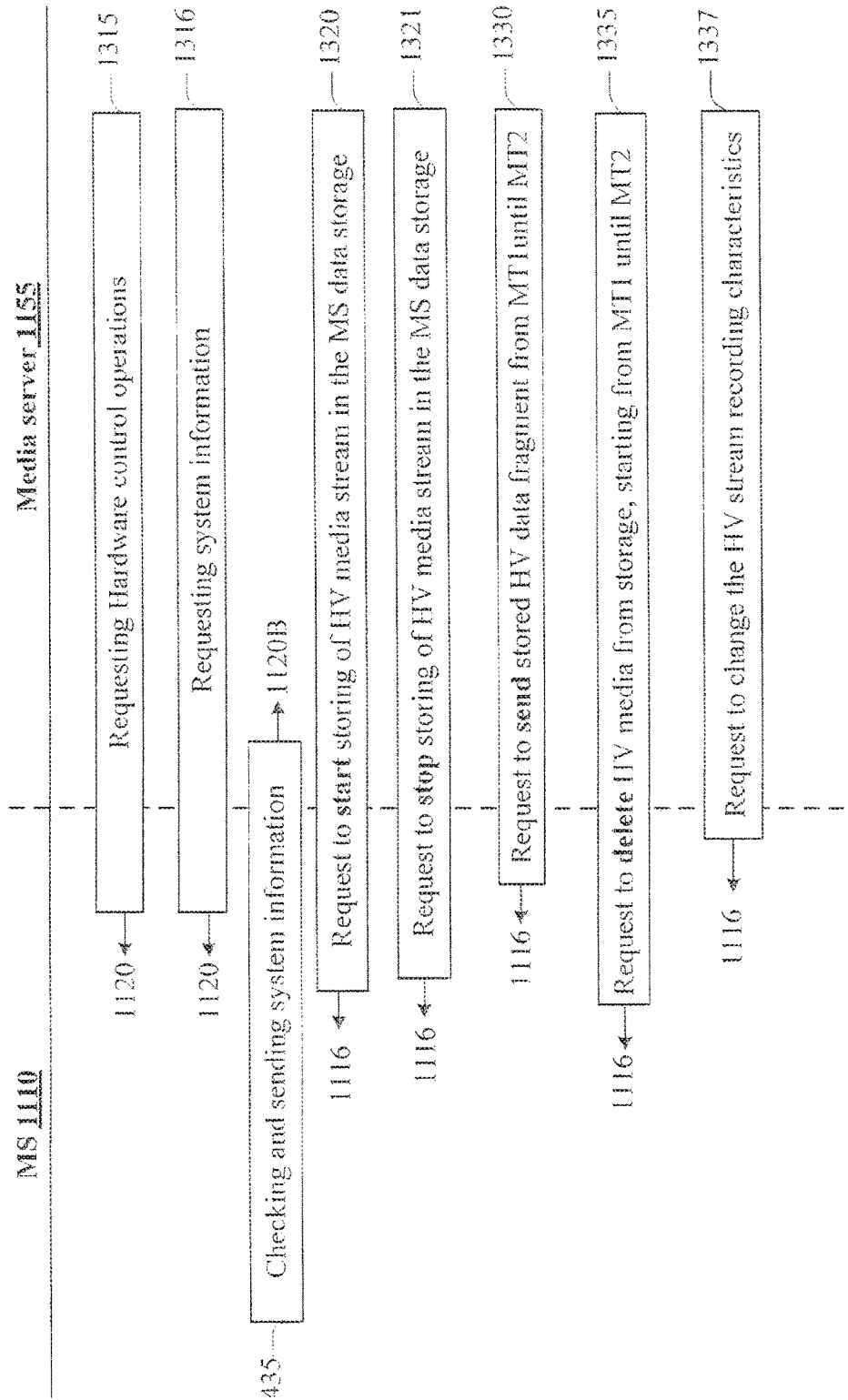

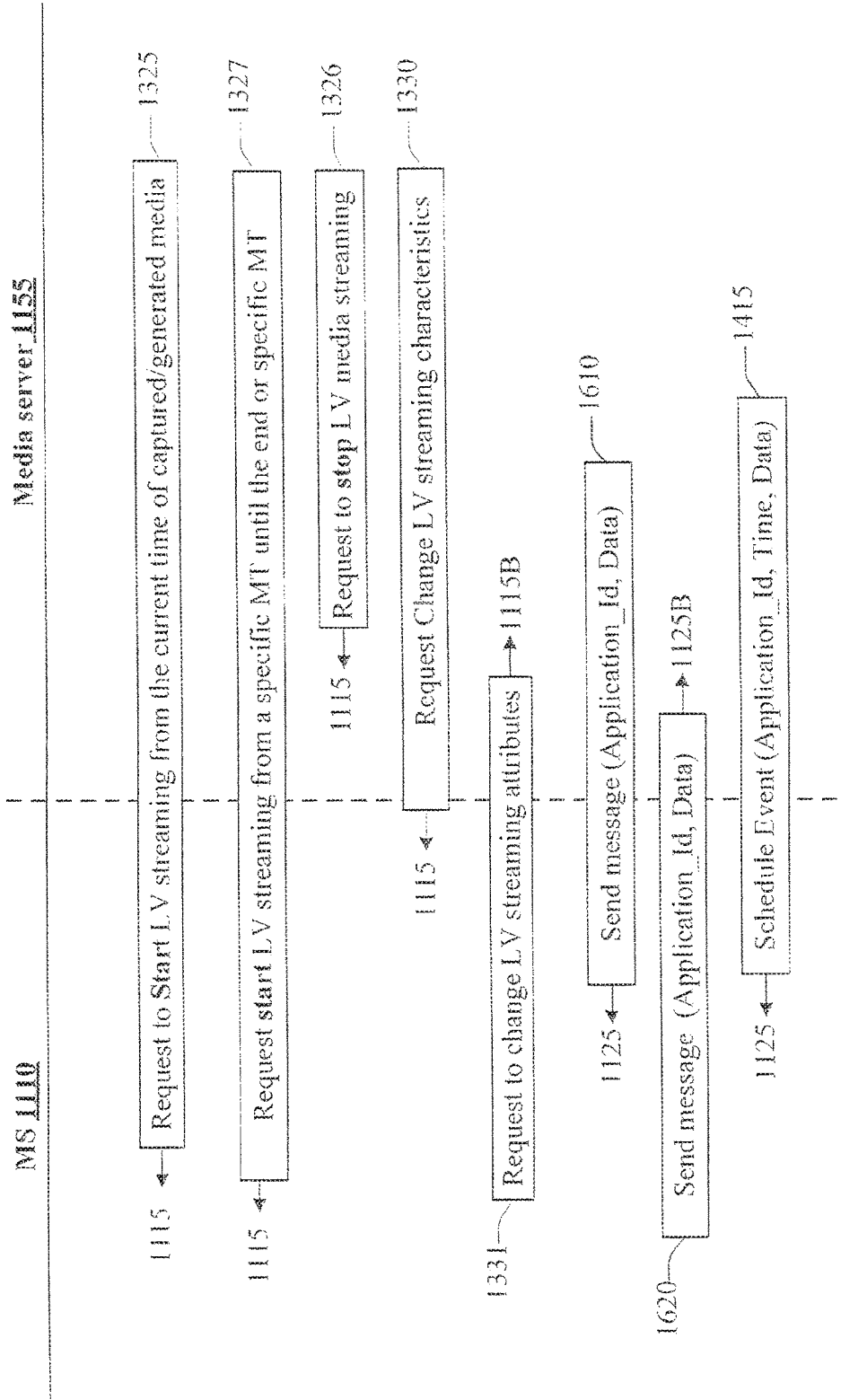

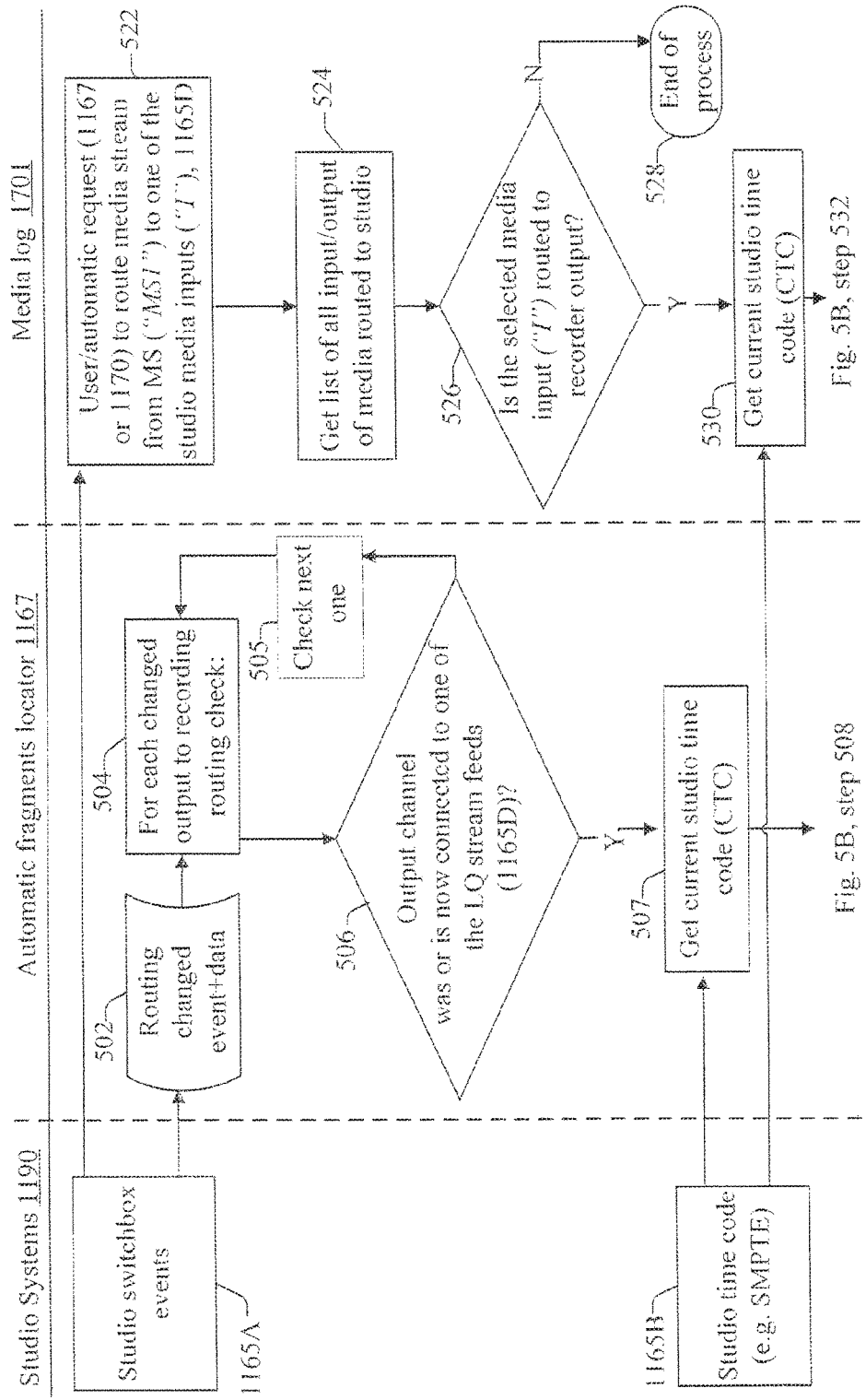

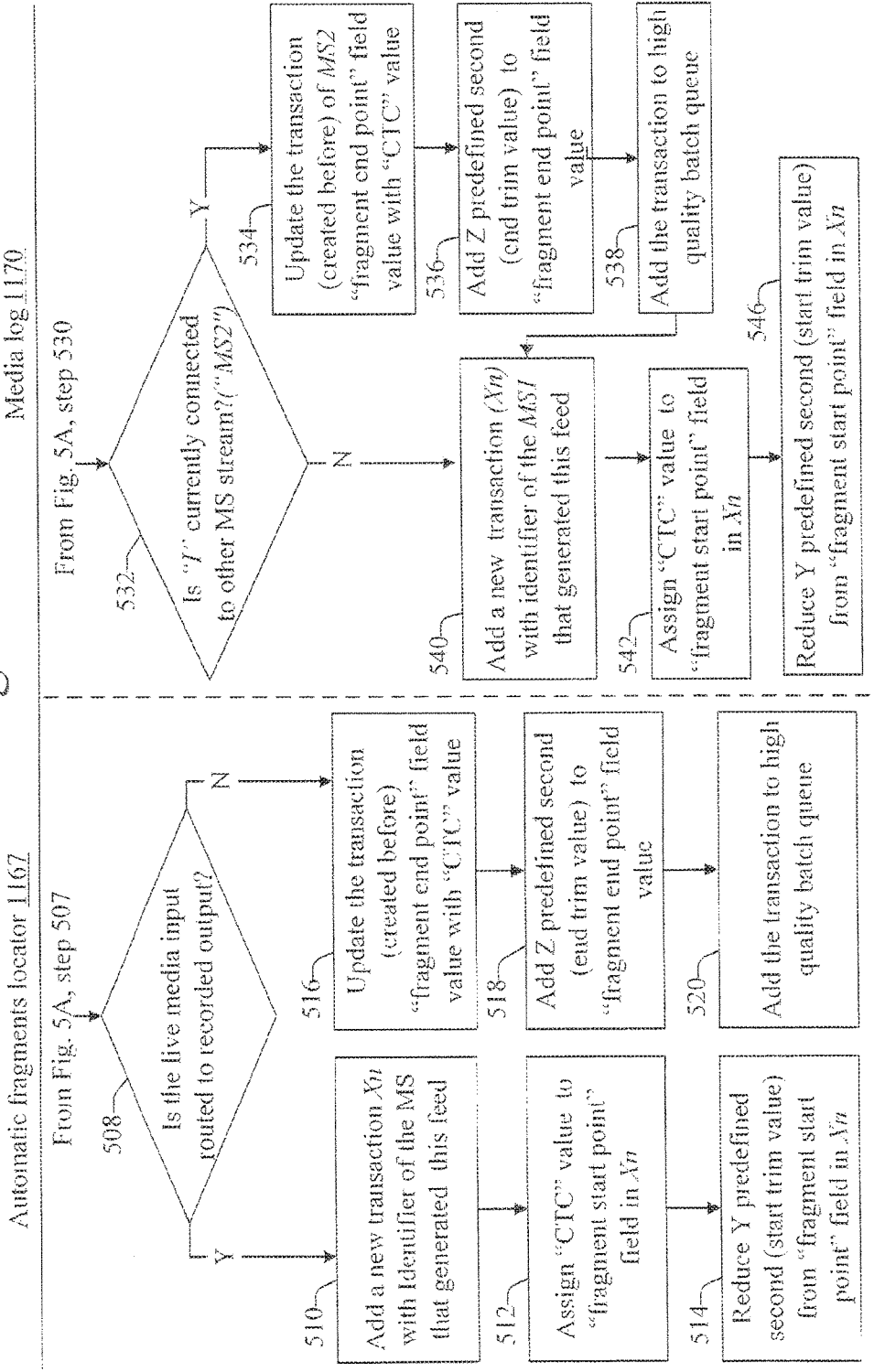

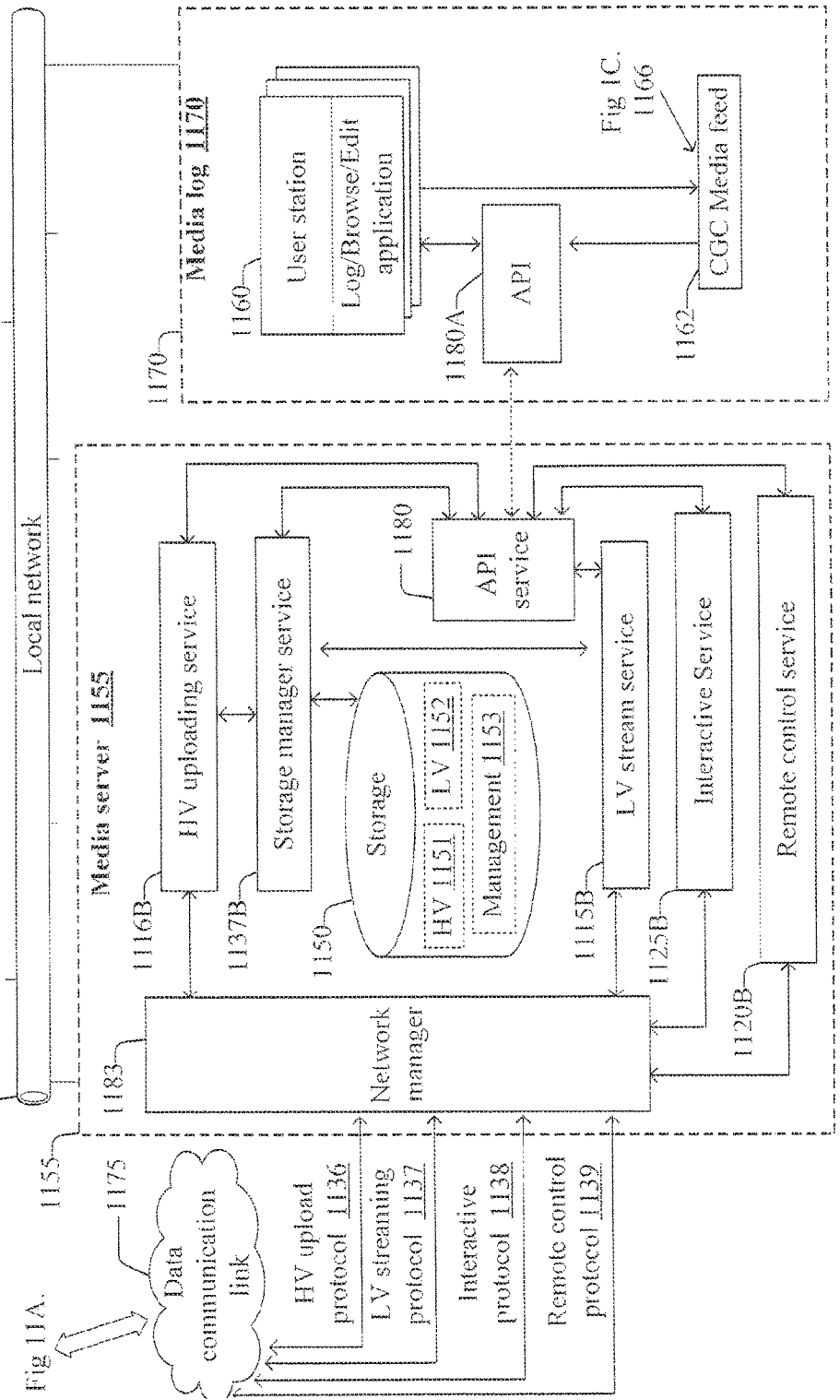

METHOD AND SYSTEM FOR CENTRAL UTILIZATION OF REMOTELY GENERATED LARGE MEDIA DATA STREAMS DESPITE NETWORK BANDWIDTH LIMITATIONS

REFERENCE TO CO-PENDING APPLICATIONS

Priority is claimed from U.S. provisional application No. 61/640,281, entitled "A Method And System For Providing Broadcast Of Media From Multiple Media Generating Sources" and filed 30 Apr. 2012.

FIELD OF THIS DISCLOSURE

The present invention relates generally to digital media and more particularly to networked systems for distributing and processing digital media.

BACKGROUND FOR THIS DISCLOSURE

Various methods and technologies are known in the art for the transmitting and streaming of digital media over different types of networks.

Nowadays, many consumer and professional devices can generate digital media which is of sufficient quality for inclusion in a professional media product for broadcasting. Devices such as Smart-phones, tablets, PCs with webcams and even consumer digital cameras can generate digital media such as High Definition Video and higher video formats.

Some solutions deliver high-quality video and live video streaming from devices, and may work e.g. over cellular networks to overcome cellular network limitations—. Some even bond several cellular networks into one trying to guarantee an higher bandwidth. But all of these solutions such as solutions from KIT digital, Ustream, Qik, Mobli, Livecast, Teradek Cube, LiveU or DSIRF or solutions for video calls such as Microsoft—Skype, Apple—FaceTime or Adobe Connect result in a video quality which is not Tier 1 broadcast quality, and their bandwidth requirements make them impracticable for continuous live broadcasting over Mobile Networks.

Some solutions and technologies e.g. as available from Avid—Interplay, EVS—XTAccess, Aurora—GC have remote editing technologies which store media in a central repository. This demands a high network volume and renders them impractical for live and interactive scenarios.

Conventional technology constituting background to certain embodiments of the present invention is described in the following publications inter alia:

US 2007/0113184 to Haot et al describe centralized editorial control of remote digital media systems.

EP 1213915 to Sony UK Ltd. (McGrath et al) describes a video processing system which generates low and high bit-rate copies of video.

EP 2242057 describes a system for multi-user remote video editing.

The disclosures of all publications and patent documents mentioned in the specification, and of the publications and patent documents cited therein directly or indirectly, are hereby incorporated by reference. Materiality of such publications and patent documents to patentability is not conceded.

Network technologies which currently support and deliver broadcast-quality HDTV video include: satellite, fiber, Optical Carrier level 3 (OC-3) and Multiprotocol Label Switching (MPLS), however they are inflexible and do not support connectivity to or from all the desired locations.

TERMINOLOGY

The following terms may be construed either in accordance with any definition thereof appearing in the prior art literature or in accordance with the specification, or as follows:

The term "media product" is intended to include, inter alia, a video stream including a live stream.

The term "broadcasting" as used herein may employ any suitable technology such as but not limited to Internet broadcast, Internet sites which support viewing media, television channels, cable television, Direct-Broadcast Satellite (DBS) or satellite television and Webcasting.

The term "Live-to-tape" as used herein is intended to describe a media production that is managed and recorded live, where additional editing of the show, and various post production procedures are performed with delay before broadcasting the show. Many TV shows and games billed as live shows are actually "live to tape".

The production facility for "live-to-tape" show typically includes at least:

a. a Media Play-out system, which may present live media streams in real-time from one or more streaming sources b. Switcher capability for selecting streams for actual show recording e.g. hardware switchers such as SONY DVS-9000 Production Switcher or Blackmagic Design ATEM 1 M/E Production Switcher, or software switcher such as the CasparCG playout system.

c. Apparatus for recording the switcher output/s. Some TV studios record to analog or digital decks such as Betacam SX or Digital Betacam; others use video server recorders such as the EVS XSnano serious.

The term "Content Generation Center" ("CGC") as used herein includes any central media processing facility e.g. a platform for creating broadcast quality multimedia content such as a studio of a live-to-tape show, an editing suite studio, or an Internet content generation center, A home computer with an editing suite software such as Adobe—Premier, Avid—Media Composer, Apple—FCP may be considered as a Content Generation Center. Also included are large TV broadcasting centers, usually including a studio with effects and graphics system, offline video Editing Suites, Online systems for color corrections and image processing, sound editing suites, studio/s with cameras, control room for managing the live show, and the like.

The term "final media product" as used herein is intended to include a media stream at "broadcast quality", a term used for describing high quality media which is sufficient for professional broadcasting, and thus employs a relatively high data rate volume compared to consumer media products. The broadcast quality requirements vary between different Content Generation Centers, according to the Content Generation Centers' broadcasting nature and requirements. An example "broadcast quality" format for final media may be a video file, coded by Mpeg-2 video codec, NTSC standard, 30 frames per second, with a resolution of 1920× 1080, which is around 62.7 Mb/s, and audio encoded in AAC codec with a bitrate of at least 96 kb/s.

The term "Media System" ("MS") as used herein is intended to include any multimedia system capable of generating or retrieving digital media data in a continuous stream that allows the data to be passed through a standard computer system. The system components may include elements as CPU, main memory, operation system and software program (which may be implemented in ASIC—Application-Specific Integrated Circuit), and may have access to memory device or disk (internally or externally). Furthermore, the system may have connection to a data network. Such a system may be implemented in a unitary device such as a Smartphone or video camera or as multiple distributed, interacting components (e.g. connecting video camera with a Personal Computer (PC)). Optionally, as mentioned, the media data may be retrieved from a data source internally or externally connected to the system such as a video camera or video recorder connected through a digital or analog connection (such as SDI, HDMI, S-Video) to an external or internal hardware capture card (such as the internal PCI Express Blackmagic Design DeckLink SDI Capture Card or the external unit Matrox MAXO2 Mini Max for Laptops which supports a variety of video inputs such as HDMI HD 10-bit, Component HD/SD 10-bit, Y/C (S-Video) 10-bit or Composite 10-bit).

The term "media", "media data" or "media stream", as used herein is intended to include any type of continuous data or data flow. Continuous media types, such as digital audio and video, have time attributes associated therewith that determine that media type's display and processing. Continuous media also may include compound digital information combining 2 or more of: video, audio, images, text, 3D movie, virtual reality content data, augmented reality content data, and the like.

The majority of current media content is captured using traditional still, video cameras and microphones. Various alternative visual sensing mechanisms are available to consumers, including stereo capture and analysis systems, 3-D scanners and depth imaging systems such as Sony 3D HDR-TD30V video camera, or HTC EVO 3D smartphone.

New multimedia means, especially virtual reality and augmented reality provide a new digital representation. In the past, "representation" of a signal was used in some contexts to refer to compression i.e. the description of a signal (audio, image or video) with as few number of bits as possible. Nowadays, however when content is managed with computers that are connected to a network, compression becomes one of many desirable characteristics, features such as object-based design, integration with computer-generated content become fundamental requirements for new media.

The terms high volume or high quality ("HV" or "HQ"), as used herein refer to characteristics of media which describe the quality of the original media stream as encoded or as it exists in the Media System storage. For example a Smartphone with camera and microphone captures a video; it is encoded in the device to a stream of video data. The application shown and described herein may store this stream as a high volume media stream, or may further process the stream e.g. as described below before storing in a Smartphone memory. High volume media data may refer to an existing data stream which is stored in the Media System memory, for example PC with a video media file. The media may be used as the high volume media stream or may be further encoded in a different format, e.g. as described below, to be stored in the Media System memory. Preferably, "HV" media is of broadcast quality.

"Broadcast quality" is intended to include media products' compliance with conventional broadcast quality requirements by major content creators and distributors such as but not limited to common technical standards stipulated by BBC, BSkyB, Channel 4, Channel 5, ITV and S4C, e.g. as documented in "Technical Standards For Delivery Of Television Programmes" available on the World Wide Web.

The terms low volume or low quality ("LV" or "LQ"), describe the media stream created after manipulating the high volume media stream and having less bitrate than the high volume media data. This stream may be streamed across a data network type according to specific requirements of the Content Generation Center.

As an example, a new Smartphone that is running an application which captures 3D video image may use a stereo capture capability and may integrate the image with a 3D live animation which the application received from the network according to the coordinates of the Smartphone Global Positioning System (GPS).

The low volume representation of this media stream may be a 2D video representation of the media compressed using H.264 video codec, 2 fps (frames per second) and 128×96 pixels resolution with audio codec AAC-LC 16 kbps maximum data rate. The resulting data stream has a maximum data rate of around 64 kbps, which also enables almost live streaming in most IP data networks, even on mobile 3G network with a limited bandwidth of 200 Kbps The term "AAF" refers to Advanced Authoring Format file interchange format created and maintained by an Advanced Media Workflow Association (AMWA) as an example format that may be employed to implement some of the methods shown and described herein. May be employed for preparing a received media stream to be used and interchangeable by a variety of video related products.

The term "EDL" (edit decision list) as used herein is intended to include an aggregation of media objects (also termed herein media items) with a time based orientation e.g. a sequence of media items (e.g. video clips) each being associated with a time-point.

Formats include CMX3600, MXF (Material Exchange Format, as described in SMPTE 377M-2004 and AS-11) and Both XML and the AAF/AMWA. The AMWA strives for compatibility between all the different EDL formats (AAF, MXF, XML and the like), meaning that media objects according to AMWA standards are interchangeable between a wide variety of video systems.

Media Timestamp ("MT") label as used herein typically comprises a propriety mechanism for a unique identification of media content in a specific slice of time, the Media Timestamp mechanism is combined with a Global time synchronization mechanism.

There are various standards for Time code ("Time code", "TC") as the most widespread standard SMPTE Time code (SMPTE—the Society of Motion Picture and Television Engineers), which is an industry standard frame numbering system that assigns a specific number to each frame of video in the format of: hours, minutes, seconds, and frames. For example Time code 03:10:50:24 of a video frame means that this frames time identification is −3 hours, 10 minutes, 50 seconds and 14 frames.

In general a Media Timestamp may include some or all of the following:
  a. MT-Pps, how many equal time Portions/slices of media stream information, the media stream contains in each second (the equivalent of Frames Per Second in SMPTE Time Code). For example a value of 100 MT-Pps means that the media data contains media information 100 times for each second.
     The MT-Pps may be defined as an integer value and may support an higher timing requirements than conventional video/audio broadcasting streams, such as Multimedia stream with a time base of a MIDI (Musical Instrument Digital Interface) media stream.

The MT-Pps may be defined up to 225 ticks per second, which is 1/256 second media stream resolution.

Regardless of the above if a support for floating point frames rates is employed, for example frame rate of 12.5 fps as an example, the Time Code syntax described in The H.264 standard (ISO/IEC 14496-10), Table D 2.2, may be applied.

b. MT-StreamStart, which may be set to the current Media System time, read from the system internal clock, at the time capture start, or alternatively it may be set to the first Time Code value of an existing media stream when no capturing and encoding is involved.

c. MT, Media Timestamp, is the offset of the media stream point in time in MT-Pps scale from MT-StreamStart, identifying absolute time value for each point of time in the media stream.

For example, in a media stream where MT-Pps is 25 (such as PAL video stream with 25 frames per second), started at MT-StreamStart=17:55 and 3 seconds, Media. Timestamp, MT, value of 1500 means: (MT=1529/MT-Pps=25)+MT-StreamStart=1.7:55:03, May be 61.16 seconds 17:55:03, which is hour 17:56 and 56.16 seconds.

d. MT-Uoffset—Supporting a global coordinated universal time.

Distributed Media Systems may reside in a different time zones, and permission typically cannot be required to change and synchronize the internal clock of the systems, for not effecting third party applications running on the same systems. An offset of the system time from a global universal time may be computed at the system start up or according to CGC request. The information may take into account the system Time Zone and the Daylight Saving time (DST) information.

The Global MT mechanism is used for various purposes such as but not limited to allowing a global time synchronized presentation of a few media streams from different media system, and/or accurate tracking of the network delay and latency between the Media Systems and the CGC.

The Global MT mechanism is used within the Messaging/Event mechanism described herein for various objectives, such as generating a global time synchronized event. As an example is a live to tape Quiz Show that is played with a multiple competitors in a remote media systems, the Game Show software may wish to utilize the Event mechanism for presenting a question to all the competitors at the same time around the globe.

MTC: global time mechanism, e.g. MT, which enables to know the absolute time and typically has units which are smaller than standard Time Codes.

SUMMARY OF CERTAIN EMBODIMENTS

Certain embodiments of the present invention seek to provide a solution for streaming and delivery of high quality media which may override network bandwidth and type limitations; usefulness may increase with the advance of media technology.

Certain embodiments of the present invention seek to provide a streaming protocol, typically Adaptive, typically also for live applications, which supports video delivery from the "field" (from non-studio end-devices) via data network communication to a central point of usage (CGC), notwithstanding network bandwidth which is a priori inadequate for the media volume being generated in the field, thereby to render Consumer devices e.g. Smartphones, Laptops, desktops, Tablets, or any consumer video enabled or media enabled networked device to be useable for professional media product creation.

Certain embodiments of the present invention seek to provide, particularly for applications (always live e.g.) in which fragments are selected for HV upload, a generic framework for media streaming not specific to any data network (IP based) or media codec, supporting a light version of the (possibly live) stream, plus an High Quality media stream (typically although not necessarily with a quality higher than conventional broadcasting means) and capable of a higher quality media stream than conventional high end means such as satellite transmission) typically characterized by one or more of:

a. very small latency (delay) and Jittering for live streaming (e.g less than 0.5 of second delays) [typically for live applications only]. Typically, the method does not seek for the highest stream quality possible as a function of an available bandwidth; and instead strives for the maximum quality that ensures minimum delay as described herein in detail.

b. backward completion (e.g. re-transmission), in background, of portions of the media stream which were not received and/or had errors, so as not to impede media production. This allows live production to continue, while having the ability to correct or check the missing parts during the recording the session or after the recording in the post production process.

c. May utilize multiple channels of data networks and over one or more data network type.

d. delivery of LV missing/errorless portions or HV portions in parallel if network condition allows, over one channel, or multiple such if available.

Certain embodiments of the present invention seek to provide e.g. for bandwidth-limited live applications, a method for providing broadcast through a data network of media from one or multiple media generating sources for the purpose of creating a single media content product in high quality, typically combined with an on-site (e.g. via on site or high speed connected storage or network Such as fiber, Optical Carrier level 3 (OC-3) or Multiprotocol Label Switching (MPLS) HV media, including capturing or using existing high quality media data and encoding real-time media data and streaming encoded media data in low quality in real-time to a CGC.

Although a data communication network. High quality media of the streamed data is maintained in a storage medium associated with the generating sources. A common time stamp is maintained for associating between the high quality media and the low quality media stream. The one or multiple media streams generated by the media generating sources are managed and coordinated through multiple communication channels at the content generation system. At the CGC "desired" high quality media fragments/portions—each of which may comprise a chunk of media stream from time A to time B are selected based on the streamed low quality media data. Next, the high quality media fragments are uploaded in the background (e.g. batched, since there is no need for live streaming) through the data communication link/s, rom the multiple media generating sources to a central content generation system.

The selection may be by a human operator. The stream may be presented in a dedicated Logging Station/s using a Graphical User Interface and enabling human operator/s' (say) user inputs for managing the streams or other operations. Selection may also be effected using conventional editing systems such as but not limited to Avid, Adobe, and by processing the final exported EDL (Edit Decision List) file. Automatic external software that provides a list of desired HV Fragments through a suitable API (Application Interface) may also be employed.

Optionally, a recognition module is provided which interfaces with conventional live studio systems and is operative for automatic identification of the desired low quality fragments which were selected and recorded during a live session. The desired identified fragments may be retrieved in uploaded/batch form through a data communication link from the multiple media generating sources to the central CGC.

Certain embodiments of the present invention seek to provide a system for transmitting high quality media data streams from a variety of remote media systems over different types of data network connections for composing high quality media products, e.g. when real time streaming is not required, e.g. in applications with very small latency as described herein.

Certain embodiments of the present invention seek to provide a general media streaming framework (system or method), independent of media type, media volume or network performance. Applicable for conventional video, but may support any media whose presentation changes over time, including media stream types such but not limited to AR (Augmented Reality), VR (Virtual Reality), as well as high volume video formats such as but not limited to 3D video, Ultra HD—4K, super Hi-Vision 8K.

The resulting protocol typically:
a. accommodates a wide variety of video formats, systems and networks; and/or
b. allows a central location to control end devices providing media products, fragments of which are to constitute a for-broadcast composite media product.

The media streaming framework (systems and methods) shown and described herein are typically operative for supporting media streams suitable for the following media generator applications inter alia:

Live Stream—When maintaining the real time aspect, live feed may be desired e.g. when short latency is the most important factor, especially in applications when an interactive dialog (for example video chat with a newsroom studio host or any Live to tape/As Live/production) is employed.

Reference Stream—usually in "field" productions, when the materials are delivered from the "field" (not from the studio facility or via fast network such as Fiber Channel) to the CGC and are edited and broadcasted later. In these situations live interaction is not required, but an editing/browsing/logging process of the materials starts essentially immediately.

Upload Stream—Uploading a media stream at CGC-determined quality, typically much lower than the original media stream quality. The media stream is uploaded for CGC as defined herein below, but the stream process typically does not start immediately and may cope with delays (e.g. may start within 10 minutes and be ready to accept delays in the Stream in all parts not yet received). Editors may start to process the stream (edit, log, browse etc.) as soon as the first complete media stream segments are ready.

From a Streaming framework point of view, the stream may be tuned to give priority to minimum latency and interactivity over media quality, or to give a priority to minimum bandwidth consumption over latency and interactivity e.g. in scenarios where the Stream may wait a few hours or days before starting to process.

Typically, MS (media system) High quality recording operations may be controlled, including performing at least one of the following actions:
a. Start recording of HV media stream in the MS storage
b. Stop recording of HV media stream
c. Delete HV media stream portion from start time to end time
d. Change attributes of the HV streaming recording (when applicable) such as but not limited to codec, compression, video size, frames per seconds, color conversions.

Controlling the MS LV streaming related operations including at least one of the following actions:
a. Start LV streaming from the current time of captured/generated media
b. Start streaming LV media from HV media specific time (MT)
c. Stop streaming of LV media
d. Change attributes of the LV streams such as but not limited to codec, compression, video size, frames per seconds, color conversions.

Controlling MS device Hardware including at least one of:
Change camera focus, zoom, change White Balance, switch to other available Camera (like a smartphone with front and read Cameras).

The erasing of the media HV is particularly useful in scenarios where the MS does not have enough storage. For example, in a live game show, a candidate may participate live through his smartphone. The show recording lasts 2 hours, but s/he has only 5 GB free space (which for example on an IPhone 5 is only a few minutes of 1080p HD video. The automatic identifying module of the desired low quality fragments in the CGC may for example have a watch dog, set up to operate at intervals e.g. periodically e.g. every 2 minutes (say), that sends all MS delete HV media requests not selected for the show recording in the last 2 minutes. This is operative in view of the assumption that a participant on a 2 hour show may not be shown for more than 5 minutes.

It is appreciated that the ratio of media used for a final composite media, relative to total media provided by various sources, may be 1:15 (e.g. for typical news, interviews), 1:125 (for documentary movies e.g.) or even 1:4000 and more (i.e in the YouTube "*LIFE IN A DAY*" UGC project).
e. greatly live applications, for example A smart-phone capable of capturing HD video, even with a 3G data typical network connection, may produce video, live and non-live, which is of sufficient quality for high end broadcasting. Certain embodiments shown and described herein enable smart phones (say)to participate and be broadcasted in live to tape application shows, at broadcast quality, easily e.g. without having to connect the smartphone to a Sattelite Ven or similar.

Certain embodiments of the present invention seek to provide a system able to receive media content contributed by dozens or thousands of remote media devices, such as for example User Generated Content (UGC) new media projects, content aggregators projects. Community Content web projects, citizen media and citizen news, Mobile Internet News Gathering (iNG), news agencies and online newspapers. Examples:
content aggregators projects 0 (such as Vimeo One Day On Earth)
citizen news—(Such as Current portal)
Online newspapers—(such as WSJ.COM portal)

Certain embodiments of the present invention seek to provide a system able to receive media content contributed by municipal or other cameras, or unmanned aircraft or other remote media systems, wherein the contributed media is delivered thereby, from the remote media systems over a conventional communication network to a central control room where live streams are managed and users may choose interesting media portions/fragments to receive in HV, so as to see details, and perform image manipulations such as zoom in or color correction.

Certain embodiments of the present invention seek to provide a platform for Social/Interactive TV content, characterized in that:
a. The content is good enough quality for "first screen".
b. LV real time functionality and MT functionality together with messages/events processing functionality which allow real time interaction during media product creation.

Certain embodiments of the present invention seek to provide a platform for Interactive live shows including embedded MT functionality together with a messages/events processing functionality, and the ability to receive live video feed from the studio. For example, An application for a specific game show, that allows dozens of smartphone holders to participate live. The video is delivered to the Live to Tape studio, and the feed with the host is presented on the user phone, for creation of a video/audio chat between CGC and users. MT and Event processing functionalities support presentation of questions to all the participates at the same time, whereupon each user may choose an answer presented to him by the application in his smartphone by using the touch screen, and the answer returns to the CGC, which in turn may return a message back to the application.

The method may comprise some or all of the following steps, suitably ordered e.g. as follows:
a. generating low volume ("LV") media stream representation from the high volume ("HV") media stream at the Media Systems,
b. streaming the low volume media stream to a central CGC ("CGC") through a data communication network,
c. maintaining a high volume media stream in a storage medium of the Media System,
d. maintaining a correlation table between media stream time and media storage position, for enabling maintenance of the stored media stream, based on time, in both high volume and low volume data streams.

Example: An MS maintains a table specifying in which storage location each time interval of the stream is located. For example assuming a video stream in H.264 encoding of 25 frames per second:
Entry100->Minute 10, resides starting from P1 on storage.
Entry101->Minute 10 and 10 seconds, resides starting from P2 on storage.
Entry102->Minute 10 and 20 seconds, resides starting from P3 on storage.
If the CGC issues a request requiring access to the stream at Minute 10 and 14 seconds, the MS looks at the table for the entry with the closest time which precedes or equal to the desired time (10 Min. 14 Sec). In this sample entry (Entry101 time is only 4 seconds before the requested time. The MS may starts to read the frames from Entry101 forward, doing partial decoding just for jumping to the next frame position. This is done for the next 100 frames (25 frames per second×4 seconds) until the desired storage location is reached. Intra frames and key frames may be taken into account e.g. as described herein.

According to certain embodiments, an MS maintains the starting MT time of a stream. This value is sent to the CGC before LV streaming begins. The CGC computes any request regarding time positions in the media stream as an offset in MT units from the beginning of the stream.

The MS, when storing the HV media stream, maintains a table which holds the position of the media stream in the storage, typically every predefined interval, e.g. 10 seconds. When a request for an HV related operation comes from the CGC, requesting HV fragments from time T1 to T1, which is the MT offset from the stream beginning, the system looks in the table for the closest storage position to T1, and since the Encoding parameters of the media, e.g. in video FPS (Frames per second) is known, it is known how many Frame units to move forward or backward for the exact storage position.

For example if the encoding is done for a video file, the correlation table may hold the previous and next I-frame/Key-frame location in storage of this specific point in time, such that additional seeking operations are avoided since in most of the video codecs a frame may be constructed only based on the first full image frame before or after him (P-Frame/B-Frame) e.g. as described herein in detail.

The CGC (CGC) may for example be operative for some or all of:
a. determining desired media fragments/portions by defining start and end points based on the received low volume streams,
b. translating the determinations of desired media fragments into a list of batch media fragments requests,
c. transmitting the requests to the multiplicity of Media Systems,
d. transferring the desired high quality media fragments from the Media Systems to the CGC over data networks, and
e. preparing the received high volume media fragments for usage by CGC systems for creating a media product in broadcast quality.

It is appreciated that any suitable "media time-stamp", i.e. any suitable time information identifying digital e.g. media content as a function of time, may be employed in the systems and methods shown and described herein, including but not limited to all variations shown and described herein. A media time-stamp may for example identify starting- and end-points of specific content, or may identify a starting point and a duration, and other variations. Also, the specific formatting or protocol described herein for the media time-stamp is not intended to be limiting.

Various time code formats may be employed e.g. CTL (control track longitudinal) timecode, developed by JVC or SMPTE timecode, defined by the Society of Motion Picture and Television Engineers in the SMPTE 12M specifications. SMPTE 12M-1 and SMPTE 12M-2.

There is an increasing need in the professional content generators world to utilize the growing amount of users' (e.g. incidental users, end users, remote users, and/or a selected subset of users from among a large population of users such as media consumers) generated content for composing professional media products such as user captured/generated news and events, creating User Generated Content media products. Moreover, there is a need to integrate these devices which may generate high quality media (such as Smartphones like HTC 1×capable of capturing 1080p video, with a stream of average 17.6 Mbps, A Nokia 808, with his 41MP camera captures an 1080p video stream with an average of 200 Mbps) and advanced networking capabilities (e.g. 4G LTE networks, or connecting to 3G/4D cellular for data and maintaining a Wi-Fi connection in parallel) into live and interactive professional media products. An example application is a live game/reality show with an audience of remote viewers playing (participating live) through their smartphone or home computers with a connected Webcam.

When streaming media from distributed devices to a central, broadcast quality content generation center (CGC) e.g. TV studio, for composing professional media products, some or all of the following major factors may be addressed according to certain embodiments:

(i) The high and increasing bitrate demands of various remote devices or "media systems" (consumer and professional) e.g.

three dimension (3D) video and media, and new compound media types such as virtual reality and augmented reality.

and/or The different characteristics of the data networks, such as bandwidth capacity and changes and/or availability of Quality Of Service (QOS, comprising requirements on all the aspects of a connection, such as service response time, loss, etc.) Many of the data networks today, e.g. Mobile networks, are—"best-effort" networks, which do not guarantee network quality.

(ii) The variety of network types, such as data network connections (e.g. Internet), mobile wireless networks, cellular networks including UTMS/3GSM, EDGE, CDMA, 4G (LTE, WiMax), and the like. Different devices and media formats. Devices with different hardware and software environments which generate a variety of a media formats (iii) When using media generated by consumers, special tools and aids maybe applied for assisting the media creation and improving its quality. For example when a user is capturing video/audio with a Smartphone, additional image stabilizing tools may be applied such as activating an image processing software as Adobe After Effects CS6 using Wrap Stabilizer for processing the HV received fragments data files which alert and help in lightening setup and camera configuration, such as photographic angle, aperture and such.

(iv) For live and interactive use of these devices, additional factors may be addressed:

1. Synchronization and time mechanism from the various devices, which operate in different networks and sometimes in different time zones.
2. Real time/near live, with very small delay, preferably not more than 0.5 second even on a network with relatively narrow bandwidth (such as 3G mobile network with an average bandwidth with 300 Kbps)

Some or all of software-implemented functionalities shown and described herein may reside on a consumer devices such as camera, smart phone or tablet, or any networked device with media capture/generation.

The present invention typically includes at least the following embodiments:

Embodiment 1. A computerized method for integrating media streams from a multiplicity of media systems over at least one network into a single media product at high media technical quality, said method comprising the steps of:
at certain media systems from among the multiplicity of media systems:

a. Generating a low volume (LV) media stream representation from a high volume media stream, whereas the low volume stream's bit-rate is different from the high volume stream's bit-rate;
b. streaming the low volume media stream to a content generation center via a data communication network;
c. Maintaining high volume local data as a high volume media stream in a storage medium coupled to at least one of the media systems; and
d. maintaining mapping information between the low volume stream and the high volume local data for enabling access to media portions in the high volume media stream storage, which correspond based on LV stream time.

Embodiment 2. A method according to any of the previous method embodiments including embodiment 1 and also comprising, at the content generation center:
e. receiving at least one low volume media stream;
f. determining desired high volume media fragments including receiving a definition for start and end points in the received low volume media streams and using a processor for translating the determinations of desired media fragments into a list of media fragment requests to be sent to the multiplicity of media systems; and
g. receiving the media fragments in high volume and processing said fragments into a media format compatible for a professional broadcasting system.

Embodiment 3. A method according to according to any of the previous method embodiments including embodiment 1 wherein said media systems include at least one media playback device.

Embodiment 4. A method according to according to any of the previous method embodiments including embodiment 2, wherein a list of desired media fragments is automatically generated by tracking a "live to tape" recording session held at the content generation center, including recognizing which fragments from the low volume media streams received from media systems were actually recorded into "live to tape" recorded media generated at said session.

Embodiment 5. A method according to any of the previous method embodiments including embodiment 4, wherein an EDL file having an EDL time line is generated and linked to received high volume media fragments, and wherein said EDL time line corresponds to the content generation center media stream recording time.

Embodiment 6. A method according to according to any of the previous method embodiments including embodiment 1 and also comprising coordinating, including synchronizing, multiple low volume media streams generated by media systems, and received by the content generation center through multiple communication channels.

Embodiment 7. A method according to according to any of the previous method embodiments including embodiment 1 and wherein at least one step of said method includes an interactive session between at least one media system and the content generation center in which data is exchanged in real time.

Embodiment 8. A method according to according to any of the previous method embodiments including embodiment 1 wherein the media stream is adapted according to content generation center requirements regarding at least one of:
a. maximum allowable delay; and
b. minimum acceptable media quality.

Embodiment 9. A method according to according to any of the previous method embodiments including embodiment 4 and wherein, in order to generate said list of fragments, an EDL file generated by an editing system and defining an EDL time line is processed for Identifying which LV media fragments are presented in the EDL time line.

Embodiment 10. A method according to according to any of the previous method embodiments including embodiment 2 wherein at least one media system at least once performs at least one of the following actions used for controlling media system high volume streaming, responsive to a control request from the content generation center:
a. locally delete high volume media stream portion from start to end points as defined by said determining;
b. Start local recording of high volume media stream in Media System storage; and
c. Stop local recording of high volume media stream.

Embodiment 11. A computerized compound media product generating system for generation of high-quality, compound media-products from component media-products provided by remote media systems, the compound media product generating system comprising:
a population of remote media systems including at least one media system, remote from the compound media product generating system, which is operative for:
  providing a high-quality, high-volume media product;
  creating, from the high-quality, high-volume media product, a low volume media stream of equal temporal duration whose bit-rate is lower than that would could accommodate the high-quality, high-volume media product; and
  streaming the low volume media stream over the data network; and
a computerized compound-media-product generation center operative for receiving the low volume media stream streamed by said at least one media system and comprising:
  a computerized representation of a low volume compound-media-product precursor, including a sequence of low volume media product fragments which are excerpted from low volume media products received from a population of media systems, each fragment associated with (a) a media time-stamp and (b) an indication, provided by media-system book-keeping functionality, of a media system which provided that fragment; and
  a low-to-high volume replacement functionality operative for generating a high-quality, high-volume compound-product by performing the following operations for each low volume media product fragment in the low volume compound-media-product precursor:
    i. using the media-system book-keeping functionality for identifying the specific media-system which provided the media product from which the fragment was excerpted;
    ii. transmitting to the specific media-system a request for a high volume fragment temporally corresponding to the time-stamp of the low volume media product fragment including using said time-stamp for identifying within the media product from which the low volume fragment was excerpted, starting- and end-points at which to excerpt the high volume fragment, which respectively correspond to starting- and end-points within the low volume media product at which the low volume media product fragment was excerpted; and
    iii. receiving the requested high volume fragment from the specific media-system and inserting the requested high volume fragment in a temporal location, within the high-quality, high-volume compound-media-product being generated, corresponding to the temporal location of the corresponding low volume fragment in the low volume compound-media-product precursor.

Embodiment 12. A system according to embodiment 11 wherein for at least one individual remote media system from among the population of remote media systems:
said high-quality volume media product requires a bit-rate too high to be streamed within a requested time frame across a given data network separating the individual media system from the computerized compound-media-product generation center,
and said low volume media product has a bit-rate low enough for streaming in accordance with compound-media-product generation center requirements, over said given data network.

Embodiment 13, A method according to any of the previous method embodiments including embodiment 2 wherein the final recording digital media stream is processed for Identifying which LV media fragments were recorded, and generating fragments list of high volume fragments to retrieve.

Embodiment 14. A method according to any of the previous method embodiments including embodiment 1 which employs a Global time code mechanism (MT) for synchronizing presentation among multiple streams.

Embodiment 15. A method according to any of the previous method embodiments including embodiment 14 wherein at least one event is triggered based on said MT.

Embodiment 16. A method according to any of the previous method embodiments including embodiment 1 wherein at least one request for a high volume fragment is sent by the low-to-high volume replacement functionality at the content generation center and wherein, responsive to said request, at least one remote media system sends at least one high volume fragment in parallel, to the LV stream if networking and computing CPU-resource conditions allow.

Embodiment 17. A method according to any of the previous method embodiments including embodiment 1 and also comprising broadcasting the single media product.

Embodiment 18. A method according to any of the previous method embodiments including embodiment 1 wherein high volume data is sent automatically by at least one media system via an API.

Embodiment 19. A computerized method for integrating media streams from a multiplicity of media systems over at least one network into a single media product for broadcasting at high media technical quality, said method comprising the steps of:
at a content generation center:
  receiving at least one low volume media stream;
  determining desired high volume media fragments including using a processor for defining start and end points in the received low volume media streams and translating the determinations of desired media fragments into a list of media fragment requests to be sent to the multiplicity of media systems; and
  receiving the media fragments in high volume and processing said fragments into a final media product whose format is compatible for a professional broadcasting system.

Embodiment 20. A method according to any of the previous method embodiments including embodiment 1 wherein said generating a low-volume stream comprises at least one of the following actions, as a result of a remote request sent by the content generation center:
   a. Start low volume media streaming
   b. Start streaming low volume media from a high volume media-time stamp
   c. Stop low volume media streaming
   d. adjust low volume media streaming characteristics by modifying a Minimum media quality parameter; and
   e. adjust low volume media streaming characteristics by modifying a low volume media streaming minimum streaming delay parameter.

Embodiment 21. A method according to any of the previous method embodiments including embodiments 10 or 20 wherein at least a media erasing functionality of the media systems is controlled by the content generation center.

Embodiment 22. A method according to any of the previous method embodiments including embodiment 1 wherein an API (Application programming interface) at the Content generation center is operative to allow an external application to select high volume fragments for uploading.

Embodiment 23. A method according to any of the previous method embodiments including embodiment 1 wherein said media systems include at least one media generation device.

Embodiment 24. A method according to any of the previous method embodiments including embodiment 1 which employs a streaming protocol defining at least one media streaming segment divided into a first plurality of data objects delivered by a second plurality of different network data channels.

Embodiment 25. A method according to any of the previous method embodiments including embodiment 24 wherein said network data channels reside on different physical networks.

Also provided, excluding signals, is a computer program comprising computer program code means for performing any of the methods shown and described herein when the program is run on a computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium. The term "non-transitory" is used herein to exclude transitory, propagating signals, but to otherwise include any volatile or non-volatile computer memory technology suitable to the application.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, Blu-ray's, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may where-ever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

Also included in the scope of the invention is any computer program product, comprising a non-transitory tangible computer readable medium having computer readable program code embodied therein, whose computer readable program code is adapted to be executed to implement any method shown and described herein.

BRIEF DESCRIPTION OF THE DRAWINGS

Certain embodiments of the present invention are illustrated in the following drawings:

FIG. 1 shows a block diagram of a Content Generation Center 145 connected to one or more Media Systems 110 (of which only one is shown, for simplicity), according to certain embodiments of the invention;

FIGS. 2a-2b are diagrams illustrating in simplified form, an interaction between the Content Generation Center 145 and an individual Media System 110 of FIG. 1, according to certain embodiments of the invention;

FIG. 3a is a diagram illustrating a Media System 110 connecting to a Content Generation Center 145, according to certain embodiments of the invention;

FIGS. 4a & 4b are simplified diagrams illustrating a set of commands and queries between a Media Server and a MS (media system which is remotely located).

FIG. 5A and FIG. 5B are simplified flowchart illustrations of methods for automatic fragment list generation, according to certain embodiments of the invention.

FIGS. 7a-7c, taken together, form a simplified functional block diagram of components and interfaces of a Media System (1110 or 110), according to certain embodiments of the invention.

Figure 2B:
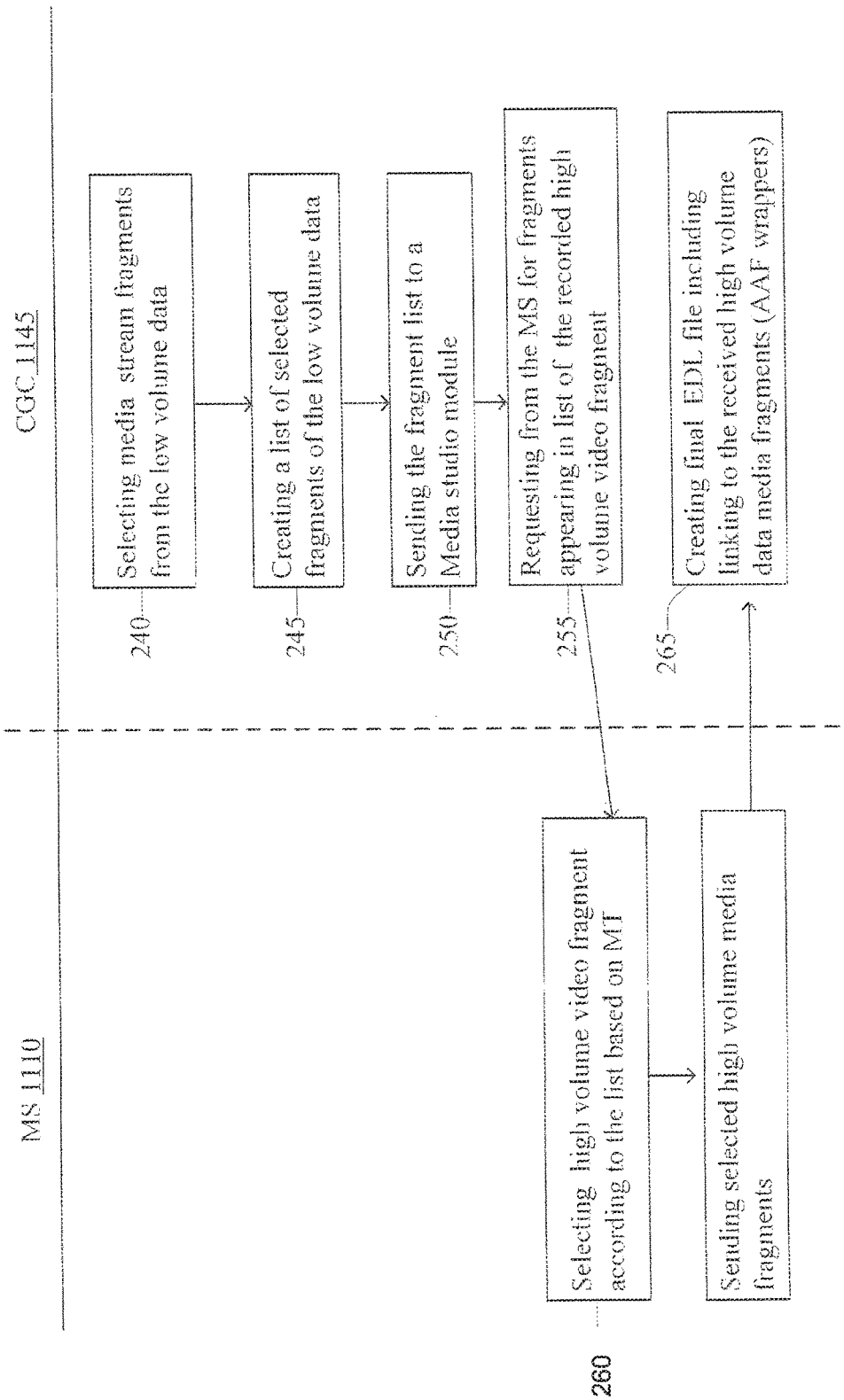

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data may be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments of the present invention provide a Content Generation Center (CGC) system that may generate media content from real time streamed media data received from multiple Media Systems (MSs). One or more Media Systems may be located remotely, each in different geographic zones. One or more CGCs may receive LV of media data in real time and create a list of selected fragments from the received media data and then send instructions to one or more Media Systems for retrieving high quality media data fragments.

In a non-limiting example, a TV channel that is broadcasting in one location may wish to produce a game-show program with a population of participants (e.g. thousands) located in any location worldwide. Dedicated show management software may be provided according to the show's specific requirements which utilize all CGC services through an application programming interface (API).

In an initial stage, the show management software may use a CGC service for getting a list of all the connected Media Systems. The participants are viewed, managed and filtered using the show management software User Interface (UI) according to the specific game-show requirements. For example, the director of the show may wish to view the list of participants from a certain country or city.

Interaction with participants may be performed via text messaging or chatting and may not necessarily require media streaming. The show management software may implement these services using Interactive Protocol messaging services e.g. as described in detail below. The show may have a dedicated show application running on the remote Media Systems, which use remote control services through a dedicated Media System API.

The show director may select in a first stage, a first set of participants (say, 100 participants) out of a larger number of potential participants which are currently connected. In a second stage, the show director may select a second set (e.g. 10 participants) out of the first set of the participants using show management software—to start delivering live video from the second set of participants and to be presented in the show application management software through the CGC API. Finally, the show director may choose a smaller set of participants (e.g. 1-4) to be displayed on the studio media monitors as part of the media sources which the show director is managing during a conventional session of a live to tape show recording. The routing of these streams to the studio video inputs may be done by show management software using Live Studio connect services through the same CGC API.

A portion of selected participants may use a Media System with media capture capabilities for filming themselves, such as a Smartphone or a computer connected to a Webcam, followed by streaming the resulting media data through an LV streaming protocol to the CGC. LV streaming enables continuous, near real time streaming of the media data, and in addition allows the participants to receive a real time LV stream input into their devices, using the LV (low volume) input service, allowing bi-directional communication (such as video chat) between the studio and the participants.

The actual show recording may continue in a conventional manner, as the few media streams are displayed in the show control monitors, while the show director chooses which of the presented media streams to record into the actual show recording (usually by instructing an assistant operating a conventional hardware or software based video switch box). The video streams from the remote Media Systems, received by the LV (low volume) media protocol, may have a lower quality than other studio video inputs, such as studio cameras or played archived materials, but the quality of the media and the delay of the streaming, may be sufficient for the live to tape session to continue, and may enable a smooth interactive dialog, such as a conversation between the show host and a remote participant.

The actual show recorded media stream may be a stream with mixed media qualities, high quality recording of all the portions of video which came from the conventional studio sources and usually a lower quality portion of the video which was received from the remote Media Systems. The Live Studio Connect component in the CGC, tracks all the studio switch box activities and tracks the LV (low volume) media fragments that were recorded. The list of LV (low volume) recorded fragments is maintained for later replacement, e.g. as described in detail herein.

The list of the recorded LV (low volume) fragments is translated into a requests for an HV media stream fragment. Each of the MSs which has a requested media may receive a list of requested media fragments (start/end time points) to send using the HV protocol e.g. as described in detail herein.

When preparing the received high volume media fragments for usage, various Content Generation Center common systems may be employed, such an Offline/Online editing suites, sound editing suites and the like.

It is appreciated that any suitable "media time-stamp", i.e. any suitable time information identifying digital e.g. media content as a function of time, may be employed in the systems and methods shown and described herein, including but not limited to all variations shown and described herein.

At the next stage, when the High Quality media fragments are uploaded and received, the fragments are converted and wrapped into an EDL format, such as AMWA which are interchangeable between a wide variety of video systems, and which traditionally reside in the CGC. An editing suite such as Avid suites (e.g. Media Composer version 6), Apple—Final Cut, Adobe-Premiere, EDIUS, Vegas and Lightworks systems, or various of other Online, effects or sound editing systems, may be used.

The EDL may be created, e.g. as described in detail below, with a Time code corresponding to the actual show recording, meaning that each of the High Quality media fragments may have a start and end Time code matching the Time code of the corresponding LV (low volume) fragment.

Figure 7A:
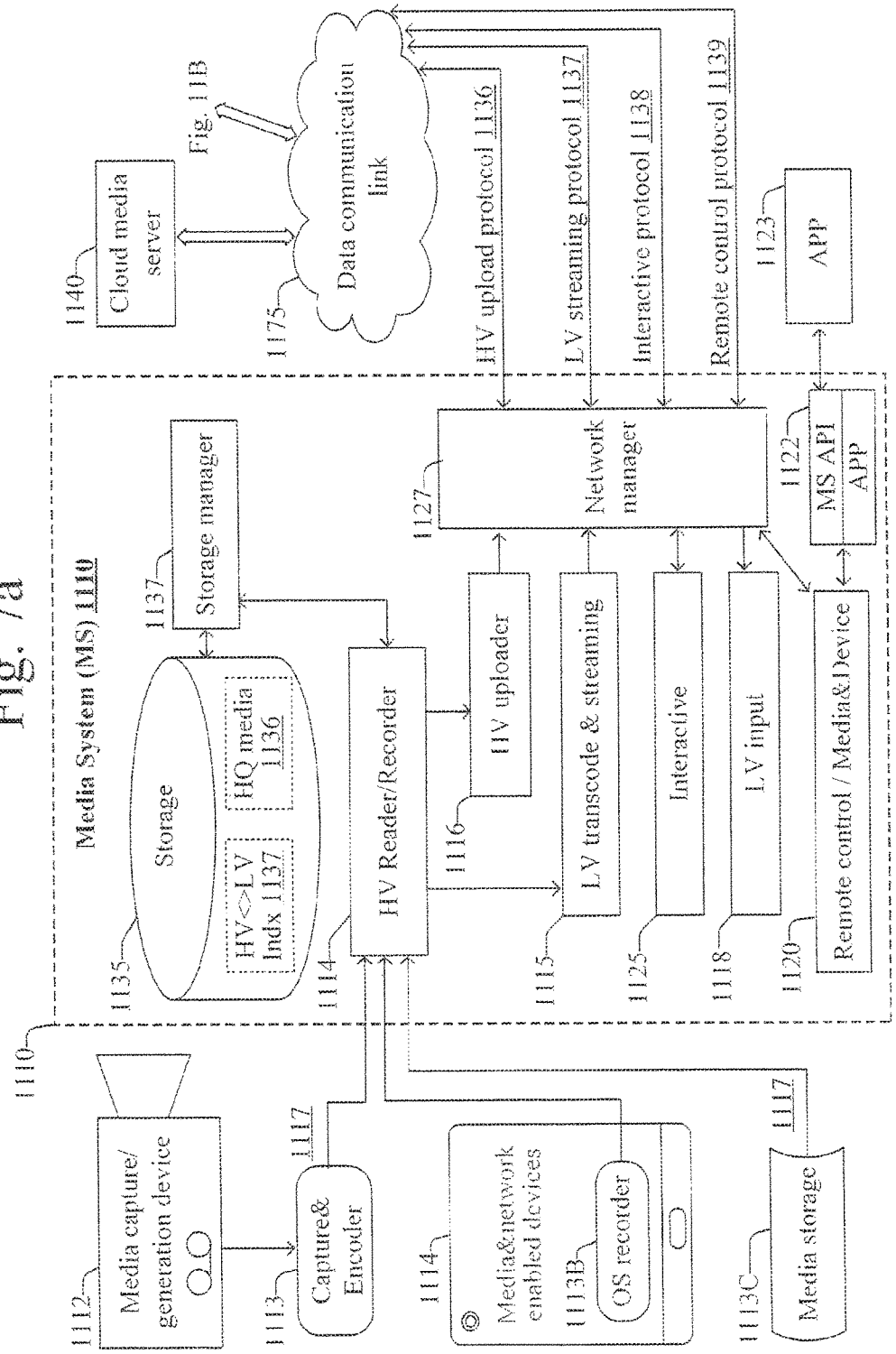
Figure 7C:
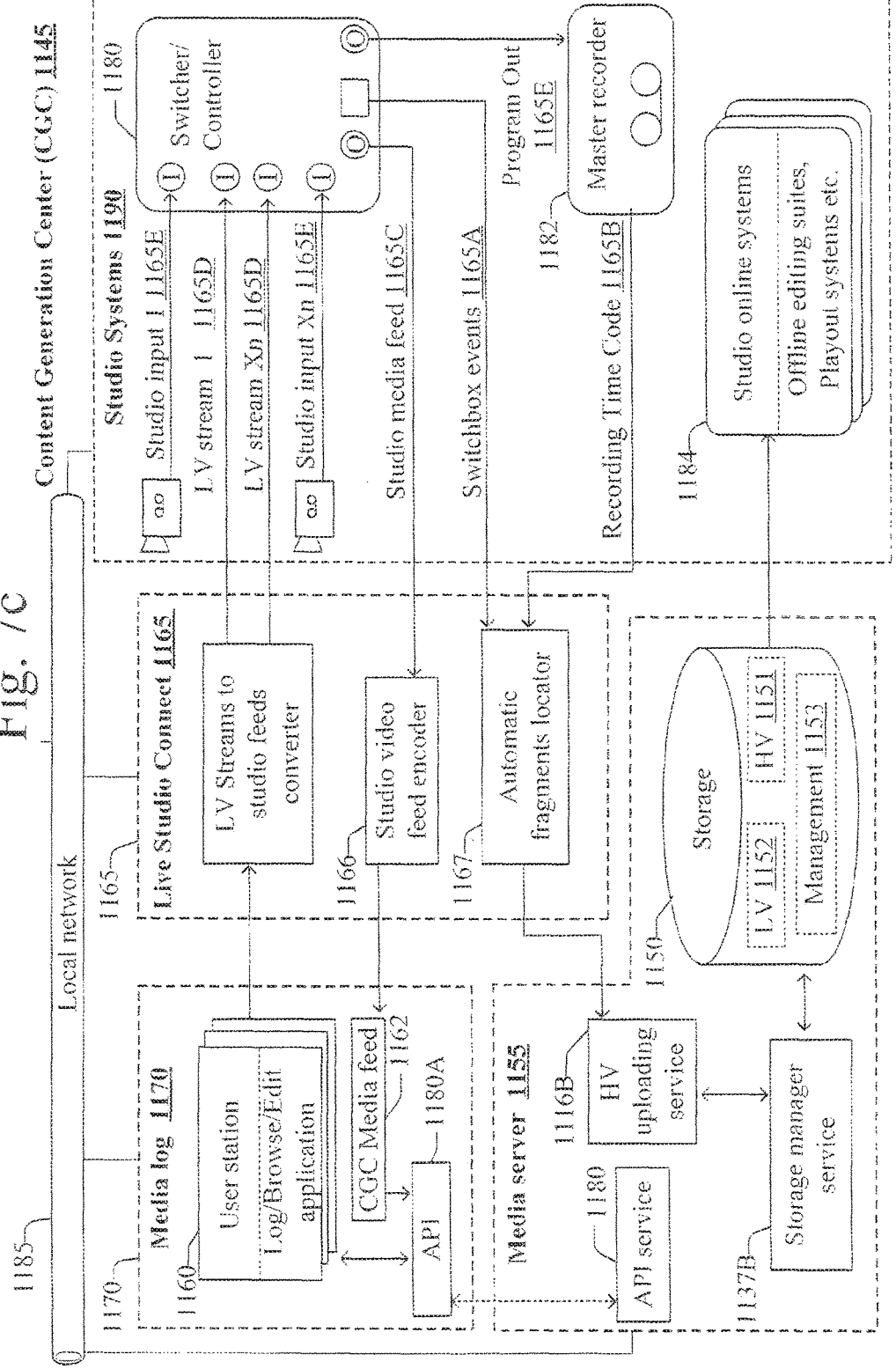

FIG. 1 shows a simplified block diagram of a Content Generation Center (CGC) system 145, including Live To Tape studio systems, connected to one or more Media Systems (MSs) 110, according to certain embodiments of the invention. FIGS. 7a-7c, taken together, show a block diagram of software components and interfaces of a Media System (1110 or 110), according to certain embodiments of the invention and the description herein relates to this embodiment as well, in the alternative.

According to an embodiment of the present invention, the TV channel may advertise a game-show for multiple participants that may be located worldwide. In response, multiple potential participants may register via a dedicated application through a data communication network such as the Internet and send a request to join the advertised game-show. The dedicated Show application may use the Interactive module 125 services through a dedicated API.

The media server 155 may be connected to the CGC 145 internally or via a high speed network. Also, the media server 155 may be connected via data communication link 175 to other instances of media servers for load balancing purposes for distributing the server's workload across multiple computers and networks 140. These instances may be located in an external facility connected to the Content Generation media server 155 through a high speed network such as a fiber, Optical Carrier level 3 (OC-3) network. According to another embodiment of the present invention, media server 155 may send a notification to the selected participants on the date and time where the game-show takes place. The notification may be presented to each participant via an Interactive Module 125 that is associated with the MS 110. Since it is a real time game-show, the date and time may be synchronized between all participants.

According to yet another embodiment of the present invention, the media server 155 may use a global coordinated universal time mechanism (MT mechanism as previously defined) for the time scheduling of the game show and all the desired interactive interaction timing events for each participant. The time scheduling may be adjusted to each participant by the media server 155, by taking into account the following information related to the participant MS 110: (i) Network delay time; (ii) offset between the MS time and the absolute network time and (iii) offset between the CGC 145 time and absolute network time.

According to yet another embodiment of the present invention, the CGC 145 may acquire permission to remotely control and use some of each MS 110 hardware and software capabilities, for example, controlling the generating process by using a device remote control module 120, which responds to activation commands from the CGC 145. Controlling the generating process may be needed when the show requires recording in high quality media from all participants. A non-limiting example is a riddle show, where all participants are presented with the same question (which was sent before but not presented yet). The CGC wants to get an HV recorded media stream from the participants starting from the moment when the question was presented to the participant.

Each MS 110 may start HV stream recording by operating media reader/recorder module 115, at the time that was computed by the media server 155. The HV media stream may be stored in data storage 130 associated with the MS 110. The data storage may be internal such as data storage 130 or external to the MS 110 such as data storage 135. The dedicated Show Application may present the Question in the MS display, and may wait for a predefined time for user input through a UI input device, such as a Smartphone touch screen.

The chosen answer from each MS is sent to the media server 155 using the MS API which in turn may use the Remote control service, for delivering the message with the answer to the CGC.

According to yet another embodiment of the present invention, while the LV data is encoded and then streamed to the CGC 145 via data communication link 175 in real-time the media reader/recorder module 115 may store or maintain the same media in high quality media data.

Using the methodology of the LV streaming protocol, according to certain embodiments of the present invention, enables minimum delay, and near live streaming of the media, due to its low data volume, and the LV protocol framework e.g. as described below. Since the media received in the live studio is used only as a reference for working, managing and recording the show, a relatively low media volume is sufficient (for example, 40 kps video+audio stream may be enough for these purposes).

According to yet another embodiment of the present invention, real time manager module 170 may receive a stream of LV data from all participants via a local data communication network through the Media Server 155. The real time manager module 170 may receive all live media LV (low volume) feeds. The real time manager module 170 may be configured to select the live media feeds automatically according to a predefined criteria or alternatively, a human operator may be using a dedicated application introducing a User Interface (UI) management tool that is associated with the real time manager module 170 to route a live LV (low volume) input to one of studio media inputs 165D. In such a case, the routing may be done using the Studio Control Platform 165, which may encode the LV (low volume) streams into a valid studio inputs (such as SDI video inputs), according to the supported studio media input types.

The selection at first stage may be performed in a dedicated Show control application, by parsing through a list of all properties of the available active MSs (such as but not limited to any of: name, gender, GPS location) and filtering according to properties. At a second stage, the filtering is conducted by browsing the LV (low volume) media feeds by a human operator, and creating a second set of participants. The operator routes at least parts of the participants' live feeds to the studio media input channels 165D, using the Studio Control Platform 165, which may encode the LV (low volume) streams into a valid video format, supported by the Studio Systems (such as SDI video inputs). The operator may later replace a live feed input with another live feed that is being routed to the same input channel in studio feeds 165D. The LV (low volume) live streams are presented in the show control monitors along with the Studio HV video feeds, such as studio cameras. The show director chooses which of the presented video streams (by specifying the monitor number that is displaying this video) to record into the actual show recording, and instructs an operator usually working with a conventional Studio Switcher.

The selection and managing of the live to tape show, is done in a traditional way, through all traditional studio systems and show management procedures.

According to yet another embodiment of the present invention, the selected fragments may be marked in a dedicated logging application residing in the real time manager module 170. A dedicated fragments list, comprising start and end points of each fragment that may be requested from a MS 110, may be generated. The dedicated list may be transmitted to each MS 110. The media and device remote control module 120 may retrieve the desired HV fragments, which correspond to the start and end point stated in the desired fragment request. HV fragment retrieval may be done using the Media reader/record and transcoder module 115 which may read the HV media data from storage 130 or 135. Then, it may send the retrieved high quality data fragments to the CGC 145. The CGC 145 may receive the high quality data fragments and may create a media file and an EDL description file as described above.

According to another embodiment of the present invention, there may be one or more real time manager modules 170. Each real time manager module 170 may receive live media feeds from different participants. The real time manager modules 170 may cooperate for coordinating multiple feeds, and share or transfer media feeds between the different real time manager 170 modules.

The real time manager module may jump to any point of streamed media back in time and play the media from that point; if this is done during live streaming the live media feed may be accumulated, and a "Return to live" UI button may be presented as an example. Activation of this button may return to the stream current time.

According to yet another embodiment of the present invention, each real time manager module 170 may have browsing, logging and editing capabilities. In case of a network problem, the real time manager module 170 may continue displaying available live media feeds and may graphically mark media (which has not yet been received) portions with a visual indication of missing data, while displaying the portion of media that has been received, if any (for example video media feed—video not received but sound has been received, the streaming sound may be heard while the video frames may contain an image showing "no media" graphic presentation). In other words, real time manager module 170 may notify on missing media parts but may continue forwarding available live media feeds. When missing parts arrive in delay they are updated in the relevant LV stream storage but the system may continue to display the live stream.

The real time manager module 170 may include a media logging software enabling UI interactions for manually marking point of interest within the media streams; the marked point may be associated with graphical and/or text notes, and also mark start and end media points (fragments)

throughout the streaming session. And at any time they may issue a request to retrieve these HV media fragments from the MSs 110. The media session may include multiple stream feeds simultaneously. The logging application may be associated with microphone, headphone and possibly a Webcam, enabling the production professional to interact with the participants using a video chat. Alternatively, an operator may decide to route a Studio media feed, such as the studio host video, as an input LV (low volume) media stream to the MS 110; the LV (low volume) media stream may be received by the Studio Control Platform 165 accessing the Studio Media feed/s 165C and encode the video stream into a LV (low volume) media stream.

According to yet another embodiment of the present invention, the CGC 145 may coordinate all live media streams to be presented at the same time according to the Media Timestamp (MT) mechanism.

According to yet another embodiment of the present invention, the CGC 145 and MS 110 through the Network manager 127 component may manage multiple channels of data. Such channels may reside in more than one data network. This feature may increase the streaming bandwidth and improve the streaming delay times.

According to yet another embodiment of the present invention, the MS 110 through the Network manager 127 component may use multiple channels to prioritize different aspects of the media stream. For example, in case of video stream from a Smartphone device, it may send the voice/audio channels using PSTN voice call in addition to the audio steamed in the LV (low volume) streaming as a redundancy, to ensure that audio may always be available in 'real time' in the CGC 145.

The studio control platform 165 typically communicates with remote studio systems 190, and may receive therefrom any or all of: switchbox events (usually through a General Purpose Interface (GPI)) input 165A, a recording time code input 165B (such as SMPTE Time code), studio media feeds 165C (such as an SDI video of a live to tape game show host). The platform 165 may provide one or more live media outputs to the remote studio systems 190.

Each MS 110 may use different network types. For example, one system may use a 3G SIM card for GPRS IP communication, another a satellite truck IP channel; still another may comprise a fast home Internet connection, another may comprise a local high speed network in the CGC itself, and so on.

FIGS. 2a and 2b, taken together, form a diagram illustrating a principal interaction between CGC 145 and MS 110, according to certain embodiments of the invention.

According to an embodiment of the present invention, a Media System (MS) 110 does not need to have capture capabilities; instead the system shown and described herein may be employed for existing media streams (stage 210). The encoded LV media stream is streamed over the network. In case of capturing, the MS 110 may store at least part of the captured media in HV quality at the MS 110 data storage 130/135 (stage 215). To each stored HV fragment, a translation information may be maintained, and stored at the MS 110 storage 130/135. This information may enable access to the HV media stream storage locations according to Media Timestamp (MT) (stage 220).

According to another embodiment of the present invention, CGC 145 may receive the streams of media data sent by multiple MS 110 (stage 230). The CGC may manage and coordinate the LV multiple streams by operating a real time manager module (stage 235).

According to yet another embodiment of the present invention, a real time manager module may select fragments (stage 240), which means determine start and end points based on the LV media stream, and create a list of desired fragments (stage 245). The real time manager module may send the list of selected media fragments to the mediator/studio module 160 that is associated with the CGC (stage 250). Next, the media mediator/studio module 160 may request from the MS (using the media server 155), HV media recorded fragments appearing in the list of selected fragments (stage 255).

According to yet another embodiment of the present invention, as a response, the MS 110 may send the HV media fragments that are associated with the list of selected fragments (stage 260). At the CGC 145 (stage 265) the received HV video fragments may be manipulated in various ways using conventional image processing with tools like the FFMPEG free software or various commercial tools such as Da Vinci Systems for post-production color grading and footage restoration tools. The fragments may be processed in order to adjust them to a unified requested format. They may be Transcoded—converted from one format to a different or similar format, changing bitrates, resolution or codecs. They may be Repacked or Transmuxed to a different Container/Envelop such as the AAF container without changing the media stream content, when not needed.

Predefined additional batch media manipulations may be performed on the media per request (such as Software stabilizers, color correction, time shifting and various media effects and filters).

Figure 6:
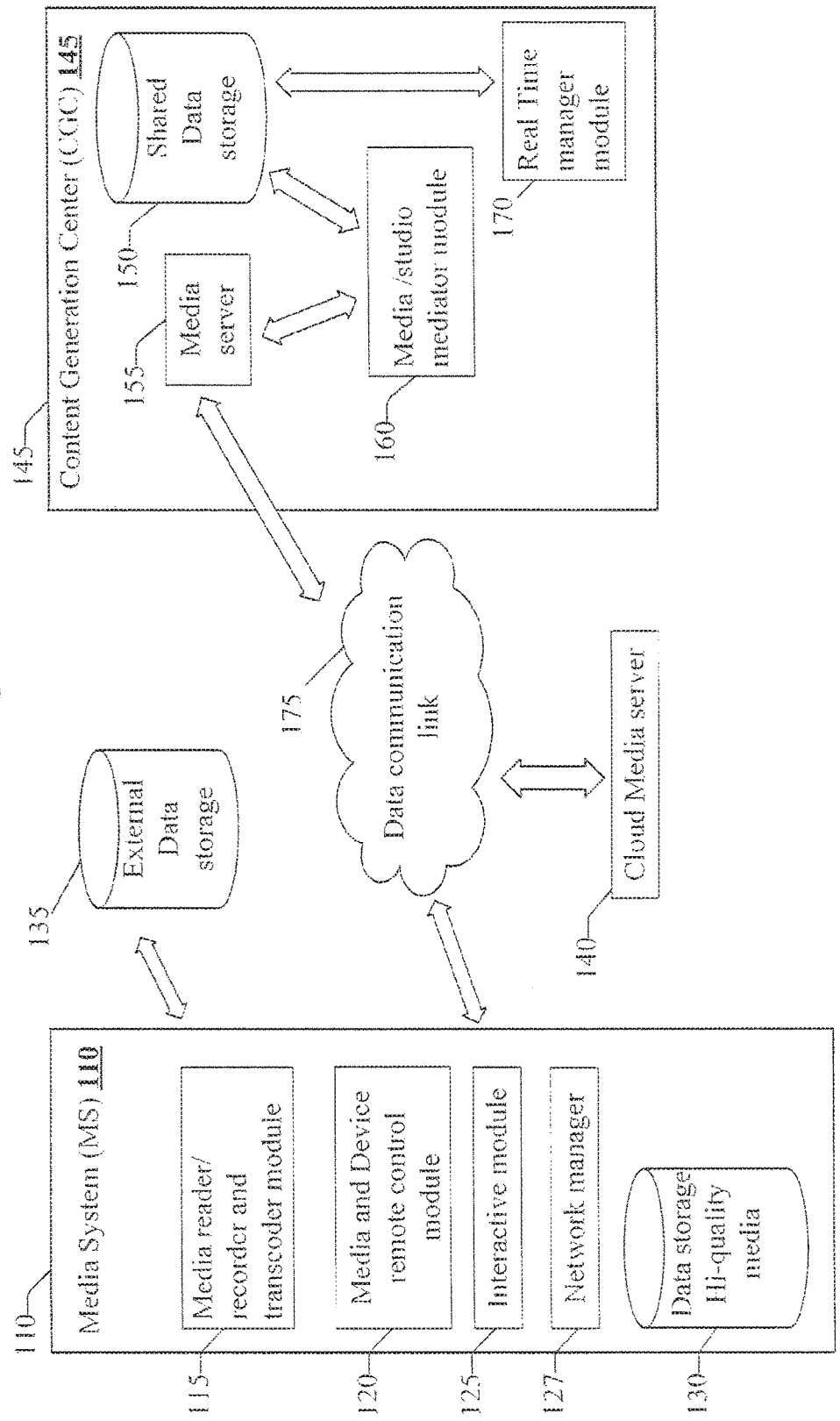
FIG. 6 is a diagram of an embodiment of the present invention suitable for non—Live To Tape Scenarios such as social web media sharing, or documentary film production originated by one or multiple sources e.g. creating a documentary based on media data generated by multiple participants using different media generating systems at different geographic locations. When implementing methods for this scenario, the low volume media sent from the media generating systems to the content generating system may also be performed after the media was recorded and not necessarily in real time.

According to certain embodiments of the present invention the system and method may refer to different scenarios of a non-live show (FIG. 6), such as social web media sharing, or documentary film production originated by one or multiple sources. Such a scenario may include creating a documentary based on media data generated by multiple participants using different MS's which may reside at different geographic locations. When implementing methods for this scenario, the LV media streams sent from the media generating systems to the content generating system may also be performed after the media has been recorded, and not necessarily in real time.

Another embodiment of the present invention, the Global Time synchronization mechanism, is described hereinabove with reference to the definition of "Media Timestamp (MT)" terminology. For implementation of the Global Time synchronization mechanism, the following procedures may be followed, upon system initialization stage, and may be repeated periodically if desired. Each Media Server 1155 at a CGC, and each MS may acquire and maintain the following time information:

1. Time offset (MT-Uoffset), which is the offset of the system time from a global universal time such as the Coordinated Universal Time (UTC) or Greenwich Mean Time (GMT).

For acquiring a global time, a network time service may be used, such as using the NTP (Network Time Protocol) and accessing an NTP server. Alternatively, if the MS has access to a mobile carrier network, the NITZ (Network Identity and Time Zone) service may be used, which returns a universal current time, time zone and DST information.

The network time services may be called a predefined number of times, for example three times, for computing an average of deviation of the network time as a result of the network Round-trip delay time (the length of time it took the request from a Media Server or MS to reach the network time service, and the time it took the network time service message to reach back to the CGC or the MS).

For example, the MT-Uoffset is computed x times in a row. Before each call, the current system time is kept as SystemTime[i]; following this, the network time service is called, and when the time is returned, it is kept as NetworkTime[i].
The MT-Uoffset may be computed as an average offset of all the calls (NetworkTime[i]−SystemTime[i])

2. System Time zone and Daylight Saving time (DST) information

The time zones around the world are set as negative or positive offsets from the UTC. These values, including the DST information, may be obtained by using a commercial or public domain service such as "The tz Database" also known as "Zoneinfo Database". These values may be periodically checked for updates, since they tend to change from time to time, for example as a result of a changing policy regarding daylight-saving in a certain country.

According to certain embodiments, the Media Server at the CGC may maintain timing information for each MS, including: i) MS time zone and Daylight saving time (DST) information and ii) Media station Time offset (MT-Uoffset). This information may enable computation of time for a time events mechanism, e.g. as described in detail in the Interactive Protocol below.

FIG. 3a is a diagram illustrating a principal connection and registration procedures and workflow between a MS's and a Media server 1155, according to certain embodiments of the invention.

Typically, when a remote MS starts an application having one or more of the MS functionalities shown and described herein, the remote system first locates the network IP address of the Media server 1155 within the desired CGC (stage 1350). On a CGC site there may be more than one Media Server connected to the same network, usually for supporting different kinds of applications. The IP address of the Media server 1155 may be a predefined IP address, or may be obtained through a web service, translating CGC—text name (e.g. "Tv3NA") and Application type (e.g "100Vs1") to an IP address. e.g. "Tv3NA_100Vs1" may be translated to the IP address "173.194.39.33".

Following this, the MS issues a Connection request (stage 1410) which typically includes at least:
  a. IP address of the Media Server; and Application type. The Media System application typically supports a predefined set of application type/s.
A series of hand shaking procedures and data exchange between the MS and the Media server may commence with conventional procedures (stage 1360) such as Authentication, Authorization, Encryption method (e.g. Secure Socket Layer (SSL), RMPTE, AES 128 encryption, etc.), Digital Rights Management Accounting and others.

Following this, handshaking information may be exchanged (stage 1410), which may include some or all of the following media streaming information:
A list of MS supported LV streams (Low Volume media streams) encoding types, and for each supported LV stream encoding type a Min/Max/preferred bandwidth value follows.

An example video of this is streaming from a Smartphone. A Smartphone may report that it may only support H.264 video codec for the LV stream, with (say) the following maximum (say) attributes: Video codec->H.264; PAL standard; Frame rate->2 fps (frames per second); Frame resolution->128×96 pixels; Audio codec->AAC-LC 16 kbps Max data rate, yielding a data stream with a data rate of around 64 kbps.
  b. Indication of whether an input LV live media stream is needed
  c. Indication whether the LV is a Live stream
  d. High volume media streaming information included in the hand shaking protocol may include a list of MS supported HV media encoding types (for HV media upload), and for each, Min/Max/Preferred bandwidth value. For example in video media with audio channel, some or all of the following parameters may be stipulated: Video codec->Mpeg-2; NTSC standard; Frame rate->30 fps (frames per second); Frame resolution->1920×1080 pixels; Audio codec->AAC codec with bitrate of at least 96 kb/s.; yielding a data stream of approximately around 62.7 Mbps.
  e. Number and types of communication channels available for streaming
  f. MS hardware and system information, which may include MS hardware characteristics, such as: System information, such as free storage, storage type, etc., screen resolution (if available), capture apparatus attributes (if presented), (for example, a smartphone may have 2 cameras—front and rear), MS machine computation strength, or other hardware attributes such as GPS availability and kind, input devices availability and kind (such as Touch screen, mouse, keyboard, etc.)

Upon completion of the handshake, the Media server 1155 may connect to all MS network channels (stage 1325) and, when completed, update the MS profile (stages 1320) and initiate MS activity through all the Media Server services.

FIGS. 4a & 4b are diagrams illustrating a set of commands and queries between a Media Server and a MS (media system which is remotely located).

The set of Commands and Queries (or any subset thereof) may be issued at any time and in any order. The messages and events are part of the Remote Control protocol 1139. At the Media Server 1155 side the protocol is handled by the "Remote Control service" 1120B, and at the MS side by the "Remote control/Media&Device" service 1120. The messages and events, when desired, are distributed among the different system services for execution.

The Media Server 1155 (also termed herein the CGCMS) may request various of hardware related operations (stage 1315), such as to select a camera that is associated with the MS or to configure the camera's settings.

A Smartphone may include three cameras, including a front one, and two back ones for 3d recording. The remote system may control which camera to activate and record, and may control camera characteristics, such as focus, zooming, White Balance, aperture, brightness, contrast, ISO.

The Media Server may require hardware or system information (Stage 1316) such as MS free storage space or location based data, battery level, location based data, or for instance for sending gyroscope and accelerometer data that may be used for example as a control Joystick For interactive games.

The MS may also check and send various system data and alerts to the Media Server 1155, for example an alert regarding free space or battery level (stage 1435).

Some of these requests are related to HV streaming, and when in the Media Server they may be transferred to the HV (high volume) uploader 1116 service. Some of the major HV related requests are: A request to start or stop storing HV data in a data storage that is associated with the MS (Stages, 1320 and 1321). The Media Server 1155 may request to send a stored HV media fragment by specifying start and end MT points (Stage 1330).

According to another embodiment of the present invention the Media Server may request from the MS to delete portions/fragments of the HV stored data, by specifying the start and end MT (stage 1335). This function is employed for various scenarios, for example in a live to tape show the Live Studio Connect 1165 may recognize that a LV stream fragment was not recorded in the final show recording, and thus the corresponding HV stream fragment is not required. Another scenario may be that alerts concerning storage capacity limit are received by the MS (stage 1435 above), thus prompting immediate action for deleting HV media data.

The Media Server may request from the MS, if the operation is supported by the MS, to change the attributes of the HV streaming recording (stage 1337), such as codec, compression, video size, frames per seconds, color conversions, etc. This request may arise for instance as a result of insufficient media quality which was observed while watching the LV stream in the Media log 1170.

According to certain embodiments of the present invention, the Media Server 1155 may issue requests related to the LV streaming operations. Such operations may be handled by the "LV (low volume) transcode & streaming" 1115 service in the MS, and may include the following:

A request to Start a LV media streaming (Stage 1325): in live scenarios the MS may start the streaming as soon as possible, while in non-live applications the media stream may be streamed from the beginning of the stream. The Media Server may issue a request to send a fragment of a LV media stream (stage 1327) specifying start and end MT points, and sometimes specifying which part of the LV media stream is desired. This command is used for example for getting fragments, or certain objects of the LV stream which were not received or had errors.

Another import request related to the LV streaming, is a request to stop a LV media streaming (stage 1326): the HV (high volume) streaming procedures in the MS may continue without any change.

A request for changing LV media streaming characteristics (Stages 1330 and 1331), may include Maximum/Minimum media quality, Desired LV media streaming, maximum delay, and media attributes such as codec, compression, video size, frames per seconds, color conversions, etc (1330). Such a request may be issued by either the Media Server 1155 or MS 1110 side, in certain scenarios such as when the MS system is overloaded and it wishes to encode the media with different attributes, which requires less computing power, such as reducing Frames Per Second in a video stream. The Media Server may issue this request as requested by its Network Manager 1183 service which is responsible for tracking all MS networking aspects, and it becomes apparent that the delay is too high. As a result, it is necessary to reduce the LV stream data volume.

Another embodiment of the present invention is the messaging and events mechanism, which enables external or third party applications, both in the MS 1110 and in the CGC 1145 to send messages and propagate events between each other. The service is implemented by the "Interactive service" 1125B at the Media Server side, which may communicate with the external application through the "API service" 1180, and at the MS side this is handled by the "Interactive" 1125 service which communicates with the application through the "MS API" 1122 interface.

The send message request (stage 1610 and 1620), may include the external application identifier value, and a data array of bytes. This message may be delivered to the external application on the other side, and an operation status (success, fail or error code) may be returned to the sending external application. An example for such usage is dedicated Quiz show management software, residing in the CGC facility 1170. The director of a show instructs the show management software operator to send a question to a competitor from a remote MS. The software calls the send message request through the "API service". The message is received in MS and is sent to the MS dedicated application through the "MS API" 1122 service. The application reads the message, presents the question on the MS screen, and returns a success status to the "MS API" 1122, which in turn may send it back to the Media Server 1155, which may deliver the status back by the "API service" 1180 to the show management software.

Similarly, for sending a message, event message (stage 1415) may be created, usually as a request from an external software 1170. The request asks to trigger an event in the MS external application at the given time. The given time is given according to the CGC facility local time. The event message may also include an array of bytes which may be delivered when propagating the event. Upon receipt of the request, the Media Server "interactive" service may translate the time from a local time to the MS time, using the Global time synchronization mechanism. The event may eventually be delivered to the "Interactive" 1125 service in the MS, and the event time may be according to the MS local timing, including Time zone and DST. The Interactive module may send this event to the external application 1122 at the specified time.

Studio equipment 190 may be identical to, replaced by or comprise studio systems 1190 in FIG. 7c.

Studio control platform 165 may be identical to, replaced by or comprise live studio connect block 1165 in FIG. 7c.

FIG. 5A and FIG. 5B illustrate a method for automatically generating a list of desired fragments based on data received from the studio switch box. The steps of the method of FIG. 5A may be performed respectively, e.g. as indicated, by studio equipment 190 of FIG. 1 (also termed herein "studio systems"), by studio control platform 165 of FIG. 1 (which may include an automatic fragment locator functionality 1167 and by content generation center 145 of FIG. 1 which may comprise one or more media logs 1170, 1705.

Referring to studio equipment 190 of FIG. 1, media mediator module activity in live-tape-content scenarios may for example comprise some or all of the following steps, suitably ordered e.g. as follows:

a. recognize when a new media data fragment of an individual capturing device (remote media system e.g.) is selected in the course of composite media product generation;
b. register a point of time, a stream ID and a starting point
c. identify source: device (remote media system e.g.) which captured the selected stream
d. generate initial EDL
e. generate request for high quality fragment corresponding to stream ID and starting point registered in (b); and convey request to source identified in (c).

There are various types of Switch Boxes e.g. switcher/controller 1180 in FIG. 7, that are used in broadcasting facilities, e.g. such as news production or other video/multimedia studios. In live-to-tape scenarios switch boxes are used to present, to a show director, relevant streams of media to choose from. The director or operator selects which monitors to route to the show recording inputs. Various interfaces are known to control and query the switchboxes, usually through a General Purpose Interface (GPI) protocol. The physical layer is usually through RS-232/422 ports and in modern boxes through USB or even network connection with TCP/IP protocol.

According to an embodiment of the present invention, GPI events are tracked for automatically generating the list of media fragments that were recorded into the live show from the low volume streams. The studio control platform (165) receives information of switch box changes events (step 502), and checks (switchbox events module 1180 in FIG. 7) if the related events indicate a change of sources which are routed to the studio show recording (steps 504, 506) from the studio switch box interface 165A.

In cases where the recorded output source is now a new live media input from the studio control platform (165) (step 508), a new transaction is created. The current studio time code (CTC) (e.g. recording time code 1165B in FIG. 7) is retrieved from studio time code interface 165B (step 507).

According to another embodiment of the present invention, a new transaction is initiated indicating a new selected fragment (step 510). Each transaction includes information of the Media System which generated the respective fragment and CTC value (step 512). For each new fragment a trim starting value, which is a few seconds before the CTC value (step 514), is defined.

According to yet another embodiment of the present invention, in case that the recorded output, replaced previously streamed input from one of the live media inputs from the studio control platform (165), end transaction is identified.

The current studio time code (CTC) is retrieved from studio time code interface 165B. Next, the transaction is updated of end of fragment recording with current value of the CTC (step 516). A trim value is added to the CTC value (step 518). Finally, the fragment transaction is added to a list of high quality desired fragments (step 520). The real time manger (170) may receive a user/automatic request for routing a media stream from the Media System to the studio media inputs (step 522), and it retrieves all input/output of media that were routed to the studio (step 524). The real time manager (170) checks if the requested media stream was selected by the director and routed to the studio recorder output (step 526). If 'no', the process ends (step 528). If 'yes' the corresponding CTC of the recorded studio show time is retrieved from the studio (step 530). At the next step, the real time manager (170) checks whether the recorded media stream is not connected to one of the media streams— e.g. by checking if the recorded media stream replaces an already open live media stream (step 532). If another media stream is replaced, the already opened transaction is updated with the end of fragment recording with current value of the CTC (step 534). A trim value is added to the CTC value (step 536). Finally the fragment transaction is added to the list of high quality desired fragments (step 538).

In both cases a new transaction is initiated, indicating a new selected segment fragment (step 540). Each transaction includes information of the Media System which generated the respective fragment and CTC value (step 542). For each new fragment a trim starting value is defined, which is a few seconds before the CTC value (step 546).

This list of fragments may be transferred to the Media server which in turn may ask the Media System's 110's to send the relevant media fragments in high quality, in a batch process.

FIGS. 11a-11c, taken together, show a block diagram of software components and interfaces of a Media System (1110 or 110), according to certain embodiments of the invention.

According to an embodiment of the present invention, the Media System is associated with data Storage 1135. Such Storage may be internal storage as illustrated or alternatively may comprise external data storage connected via a high speed network. All MS storage activities may be performed and managed through the Storage manager 1137 service.

According to another embodiment of the present invention, the MS is connected to a data network through a data communication link (1175 or 175). The network may comprise, for example, data network connections (e.g. Internet), mobile wireless networks, cellular networks including TMS/ 3GSM, EDGE, CDMA, 4G (LTE, WiMax). The data link/s of the MS is/are maintained by the Network manager 1127 service, which typically handles a few data connections which may be divided over a few different networks.

According to another embodiment of the present invention, the Network manager 1127 is responsible for handling all MS communication with at least one CGC (1145 or 145), by employing few communication protocols such as but not limited to some or all of: "HV upload protocol" 1136, which is responsible for the HV media streaming activities, the "Interactive protocol" 1138 which communicates with both the "Interactive" 1125 and the "Remote control/ Media&Device" services, "Remote control protocol" 1139 which communicates with the "Remote control/ Media&Device" 1120 service and the "LV upload protocol" 1137, which is responsible for the LV media streaming from the MS, as well as for receiving LV media streams from the CGC when necessary, for example for a video chat with the CGC. The LV received media streams may be handled via the "LV input" 1118 service.

According to another embodiment of the present invention, the Media System is coordinated and activated via a software component "APP" 1123, which may operate on the MS system or externally via a data communication link. In both cases the "MS API" 1122 component is typically responsible for all the communication between the software and the MS services. The "MS API" 1122 use the "Remote control/Media&Device" service 1120 for interfacing with the MS.

According to another embodiment of the present invention the "Remote control/Media&Device" service 1120 handles a various hardware related activities as well as managing the messages and events mechanism (e.g. as described herein with reference to FIGS. 4a and 4b). The service may communicate with the CGC (through the Network manager 1127) over a UDP (User Datagram Protocol) based communication protocol. In such case, when desired, it may send an Acknowledgements(Ack) for received messages, and may track Ack for sent messages, as well as employing a re-transmit policy, when necessary, e.g. when Ack messages are not received within a given time.

According to another embodiment of the present invention, the Media System may reside as a software component within a device which as media capture, generation or playback capabilities, such as illustrated under "Media&network enabled devices" 1114. Example for such devices include but are not limited to Smartphones, Tablets, Interactive TVs with Webcams and networking, and other kinds.

According to another embodiment of the present invention, the Media System may be installed on a computer, such as but not limited to a PC, and may receive media streams through a network communication channel 1117. Any suitable configuration may be employed, such as but not limited to the two illustrated configurations: "Media storage" 1113C is shown with a connection to external storage. The storage may contain ready media files or media files currently been generated by other systems which may allow shared access to the media. Another example is an network connection to a capture or encoding device, shown as Media capture/generation device 1112. In the illustrated embodiment, a professional video camera "Media capture/generation device" 1112 is shown capturing video or alternatively playing back a video file. A reference video output (such as but not limited to SDI and HDMI) is connected to an external Capture&Encoder device 1113, which captures the video signal in real time and delivers the captured video signal as a media stream through a network connection 1117 to the Media System PC.

According to another embodiment of the present invention, the reading and storing of the HV media stream is handled by the "HV Reader/Recorder" 1114 service.

The service may support in a live mode, when a real time HV media stream is received, or may be operated for streaming an existing media streams from the Storage 1135.

During live streaming, the service may deliver the live stream to the "LV transcode & streaming" 1115 service, for encoding and streaming of the LV version of the stream. The service, when appropriate, may process the incoming media stream and divide the incoming media stream into stream segments of an equal predefined time length. When a new media stream fragment is ready the service may trigger an event to the "LV transcode & streaming" 1115 service, with the details of the segment location in a shared memory. When streaming an existing media stream, the service may read the media stream file sequentially, while preparing the HV stream segments for "LV transcode&streaming" 1115 service in the same way.

According to another embodiment of the present invention, for implementing the mapping information between the LV stream and the HV stream, the "HV Reader/Recorder" 1114 service may maintain a mapping table for each HV (high volume) media stream, which may allow access to the HV (high volume) media stream file position at the storage according to MT time.

One possible implementation is to maintain some or all of the following details:

For each HV (high volume) media stream, some or all of the following information may be maintained:
1. MT-StreamStart—Stream start of the media stream in MT format, which is a global time (includes Time Zone and DST information)
2. List of stream segments ordered sequentially (Segments_List)—
   a. Segment file name, may be the same for all segments
   b. Frames per second of the current segment—During a live streaming according to some standards, the FPS rate may change in the middle of stream. When a FPS change occurs a new entry of a stream segment may be created in this list.
   c. MT, Media Timestamp—The time offset of this segment from the stream beginning in time in FPS scale
3. For enhancing performance an additional table may be maintained which add every predefined time slot, let's say 20 seconds, a new entry with the details of the current segment entry index in the Segments_List and the storage position of the current frame in the media stream Upon a request to access a specific MT, (MT—MT-StreamStart) rounded to FPS units, may be the time offset of the needed frame. From the maintained information look to the closest file position to the MT. The media stream file may be read starting at this point, encoding may be performed until reading the requested frame. For a certain video encoding applications, this encoding may include backward-locating the first fully-specified picture frame known as al-frame or intra-coded picture frame. Since the wanted start position may be a frame of "P-frame" or "B-frame" types, the method may seek backward in the media file to a 1-frame and reconstruct the requested frame.

Further enhancements for this mechanism may be provided for different encodings. For example information may be maintained, in the offsets table, regarding the previous and next I-frame storage location. Thereby, additional seeking operations may be avoided since in most of the video codecs a frame may be constructed only based on the first full image frame before or thereafter (P-Frame/B-Frame).

Functionalities of the Media System (MS) 110 of FIG. 1 or 1110 of FIG. 7*a* may include some or all of:
  HV (high volume) media storage up to native quality
  Generates low volume real time streaming of the captured/HV (high volume) video
  Maintains correlation between the streamed media and the stored HV (high volume) media
  Interactive & events mechanism
  Supports always live LV (low volume) video streaming
  Remote control—video quality and device
  e.g. some or all of: Start/Stop streaming, change focus, zoom
  Remote media fragments uploader
    1. Upload only requested media fragments based on given start/end time code
    2. Work in parallel with real time streaming protocol
    3. Any quality up to client native quality
    4. Media conversions may be done either on the client or the studio side
  Redundancy: e.g: voice
  Supports incoming LV (low volume) media stream (For example for a Bi-directional video/audio chat implementation)

Functionalities of the Media Log 1170 may include some or all of:
  Switchboard for manage dozens of parallel sources
  Control and manage the remote devices
  Synchronize all with our global time code mechanism
  Log and select the HV (high volume) media fragments for uploading
  Send real time video+audio feed to the end devices
  SDI/HDMI/DVI outputs
  Multiple instances of Media Logger
  EDL import from NLE, for creating HV (high volume) fragments list Functionalities of the Media Server 1155 may include some or all of:
  Manage Networking/Transactions/priorities, etc
  Media files build
  Video Calls "Switch Box"
  Conversions and image processing Functionalities of the Live Studio Connect e.g. module 1165 may include some or all of:
  Convert live feeds to studio inputs
  Software switcher with up to 8 SDI outputs
  Automatic recognition of recorded fragments of the live streaming
  EDL generation with studio time code
  SDK and XML protocol for game shows It is appreciated that the methods and systems shown and described herein show various different functionalities which together support applications such as live trivia shows. However, for other applications, only suitable subsets of the functionalities described herein, may be provided, rather than all such functionalities.

The system may, if desired, be implemented as a web-based system employing software, computers, routers and telecommunications equipment as appropriate.

Methods and systems shown and described herein may be applicable to formats and protocols which are not identical to those mentioned herein but have relevant features in common therewith.

It is appreciated that terminology such as "mandatory", "required", "need" and "must" refer to implementation choices made within the context of a particular implementation or application described herewithin for clarity and are not intended to be limiting since in an alternative implantation. The same elements may be defined as not mandatory and not required or may even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps or operations of any of the methods shown and described herein, in any suitable order including simultaneous performance of suitable groups of steps as appropriate; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment, or in a certain order, may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof may also be provided as methods and steps therewithin, and functionalities described or illustrated as methods and steps therewithin may also be provided as systems and sub-units thereof. The scale used to illustrate various elements in the drawings is merely exemplary and/or appropriate for clarity of presentation and is not intended to be limiting.

The invention claimed is:

1. A computerized method for integrating media streams from a multiplicity of media systems into a single media product at high media technical quality, said method comprising:
    at certain media systems from among the multiplicity of media systems:
        a. generating a low volume (LV) media stream representation from a high volume media stream, whereas a bit-rate of the low volume stream is different from a bit-rate of the high volume stream;

b. streaming the low volume media stream to a content generation center common to all the multiplicity of media systems via a data communication network;

c. maintaining high volume local data as a high volume media stream in a storage medium coupled to at least one of the media systems; and d. maintaining mapping information between the low volume stream and the high volume local data for enabling access to media portions in the high volume media stream storage, which correspond based on LV stream time and responsive to a list of media fragment requests, including start and end points received from the content generation center, sending only requested media fragments in high volume to the content generation center.

2. A method according to claim 1, further comprising, at the content generation center:

e. receiving at least one low volume media stream; and f. determining desired high volume media fragments including receiving a definition for start and end points in the received low volume media streams and using a processor for translating the determinations of desired media fragments at least one list of media fragment requests to be sent to at least some of the multiplicity of media systems; and g. receiving the media fragments in high volume and processing said fragments into a media format compatible for a professional broadcasting system.

3. A method according to claim 1, wherein said media systems include at least one media playback device.

4. A method according to claim 2, wherein a list of desired media fragments is automatically generated by tracking a "live to tape" recording session held at the content generation center, including recognizing which fragments from the low volume media streams received from media systems were actually recorded into "live to tape" recorded media generated at said session.

5. A method according to claim 4, wherein an EDL file having an EDL time line is generated and linked to received high volume media fragments, and wherein said EDL time line corresponds to the content generation center media stream recording time.

6. A method according to claim 1, further comprising coordinating, including synchronizing, multiple low volume media streams generated by media systems, and received by the content generation center through multiple communication channels.

7. A method according to claim 1, wherein at least one of said generating, streaming, maintaining high volume local data and maintaining mapping information includes an interactive session between at least one media system and the content generation center in which data is exchanged in real time.

8. A method according to claim 1, wherein the media stream is adapted according to at least one content generation center requirements regarding at least one maximum allowable delay; and minimum acceptable media quality.

9. A method according to claim 4, wherein, in order to generate said list of fragments, an EDL file generated by an editing system and defining an EDL time line is processed for Identifying which LV media fragments are presented in the EDL time line.

10. A method according to claim 2, wherein at least one media system at least once performs at least one of the following actions used for controlling media system high volume streaming, responsive to a control request from the content generation center:

locally delete high volume media stream portion from start to end points as defined by said determining;

start local recording of high volume media stream in Media System storage; and stop local recording of high volume media stream.

11. A non-transitory computerized compound media product generating system for generation of high-quality, compound media-products from component media-products provided by remote media systems, the non-transitory compound media product generating system comprising:

a population of remote media systems including at least one media system, remote from the compound media product generating system, which includes a processor executing instructions to perform:

providing a high-quality, high volume media product;

creating, from the high-quality, high volume media product, a low volume media stream of equal temporal duration having a bit-rate that is lower than that which could accommodate the high-quality, high volume media product; and streaming the low volume media stream over the data network; and a computerized compound-media-product generation center operative for receiving the low volume media stream streamed by said at least one media system and comprising:

a computerized representation of a low volume compound-media-product precursor, including a sequence of low volume media product fragments which are excerpted from low volume media products received from a population of media systems, each fragment associated with (a) a media time-stamp and (b) an indication, provided by media-system book-keeping functionality, of a media system which provided that fragment; and a low-to-high volume replacement functionality operative for generating a high-quality, high volume compound-product by performing the following operations for each low volume media product fragment in the low volume compound-media-product precursor:

i) using the media-system book-keeping functionality for identifying the specific media-system which provided the media product from which the fragment was excerpted;

ii) transmitting to the specific media-system a request for a high volume fragment temporally corresponding to the time-stamp of the low volume media product fragment including using said time-stamp for identifying within the media product from which the low volume fragment was excerpted, starting- and end-points at which to excerpt the high volume fragment, which respectively correspond to starting- and end-points within the low volume media product at which the low volume media product fragment was excerpted; and iii) receiving the requested high volume fragment from the specific media-system and inserting the requested high volume fragment in a temporal location, within the high-quality, high volume compound-media-product being generated, corresponding to the temporal location of the corresponding low volume fragment in the low volume compound-media-product precursor.

12. A system according to claim 11, wherein for at least one individual remote media system from among the population of remote media systems:
  said high-quality volume media product requires a bit-rate too high to be streamed within a requested time frame across a given data network separating the individual media system from the computerized compound-media-product generation center, and
  said low volume media product has a bit-rate low enough for streaming in accordance with compound-media-product generation center requirements, over said given data network.

13. A method according to claim 2, wherein a final recording digital media stream is processed for identifying which LV media fragments were recorded, and generating fragments list of high volume fragments to retrieve.

14. A method according to claim 1, comprising using a Global time code mechanism (MT) for synchronizing presentation among multiple streams.

15. A method according to claim 14, wherein at least one event is triggered based on said MT.

16. A method according to claim 1, wherein at least one request for a high volume fragment is sent by the low-to-high volume replacement functionality at the content generation center and wherein, responsive to said request, at least one remote media system sends at least one high volume fragment in parallel, to the LV stream if networking and computing CPU-resource conditions allow.

17. A method according to claim 1, further comprising broadcasting the single media product.

18. A method according to claim 1, wherein high volume data is sent automatically by at least one media system in response to a request received via an API (Application programming interface).

19. A computerized method for integrating media streams from a multiplicity of media systems over at least one network into a single media product for broadcasting at high media technical quality, said method comprising:
  at a content generation center:
    receiving at least one low volume media stream from the multiplicity of media systems over the at least one network;
    determining desired high volume media fragments including using a processor for defining start and end points in the received low volume media streams and translating the determinations of desired media fragments into at least one list of media fragment requests and sending said list to at least some of the multiplicity of media systems; and
    receiving the media fragments in high volume and processing said fragments into a final media product whose format is compatible for a professional broadcasting system.

20. A method according to claim 1, wherein said generating a low-volume stream comprises at least one of the following actions, as a result of a remote request sent by the content generation center:
  starting low volume media streaming;
  starting streaming low volume media from a high volume media-time stamp;
  stopping low volume media streaming;
  adjusting low volume media streaming characteristics by modifying a Minimum media quality parameter; and
  adjusting low volume media streaming characteristics by modifying a low volume media streaming minimum streaming delay parameter.

21. A method according to claim 10, wherein at least a media erasing functionality of the media systems is controlled by the content generation center.

22. A method according to claim 1, wherein an API (Application programming interface) at the Content generation center is operative to allow an external application to select high volume fragments for uploading.

23. A method according to claim 1, wherein said media systems include at least one media generation device.

24. A method according to claim 1, comprising employing a streaming protocol defining at least one media streaming segment divided into a first plurality of data objects delivered by a second plurality of different network data channels.

25. A method according to claim 24, wherein said network data channels reside on different physical networks.

26. A method according to claim 20, wherein at least a media erasing functionality of the media systems is controlled by the content generation center.

27. A method according to claim 1, wherein at least one of said media systems has at least one media capture capability and wherein said streaming comprises streaming resulting media data through a low volume streaming protocol to said center facilitating continuous, near real time streaming of the media data, and allowing participants employing said media systems for filming to receive a real time low volume stream input, for bi-directional communication between the center and the participants.

28. A system according to claim 11, wherein said high quality media product is entirely high quality.

29. A system according to claim 11, wherein at least one low volume stream is encoded centrally into a video format supported by associated Studio Systems thereby to support an operator's optional later replacement of a live feed input associated with an input channel with another live feed being routed to the same input channel and wherein low volume live streams are presented in show control monitors along with high volume video feeds associated with studio cameras and wherein a show director's choice of which of the presented streams is indicated by identifying an individual one of said monitors that is displaying this stream and wherein said director's choice is then record into an actual show recording by an operator working with a conventional Studio Switch box.

30. A method according to claim 1, wherein multiple potential participants in a real-time/live show register via a dedicated application through a data communication network, said dedicated application using Interactive module services via a dedicated API and wherein notification is sent to at least selected participants from among said multiple participants regarding timing of the real-time/live show, via said Interactive Module and wherein upon receipt, at least one "interactive" service associated with a media system translates said timing to the Media system's local timing, using a Global time synchronization mechanism.

31. A method according to claim 30, further comprising a Network manager operative to employ plural communication protocols including an "HV upload protocol" responsible for HV media streaming activities, and an "LV upload protocol" responsible for LV media streaming from at least one individual media system; as well as for receiving LV media streams from the content generation center, at least for a chat between the individual media system and the content generation center.

32. A method according to claim 1, wherein the media stream is adapted according to at least one content generation center requirements regarding minimum acceptable media quality.

* * * * *